United States Patent
Liu et al.

(10) Patent No.: US 12,430,242 B2
(45) Date of Patent: Sep. 30, 2025

(54) FLASH MEMORY ACCESS METHOD AND APPARATUS

(71) Applicant: HUAWEI TECHNOLOGIES CO., LTD., Guangdong (CN)

(72) Inventors: Fengxi Liu, Shenzhen (CN); Jinxiu Liu, Shenzhen (CN); Angang Deng, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 67 days.

(21) Appl. No.: 18/476,459

(22) Filed: Sep. 28, 2023

(65) Prior Publication Data
US 2024/0020229 A1    Jan. 18, 2024

Related U.S. Application Data

(63) Continuation of application No. PCT/CN2021/083680, filed on Mar. 29, 2021.

(51) Int. Cl.
    *G06F 12/02* (2006.01)
(52) U.S. Cl.
    CPC .................. *G06F 12/0246* (2013.01)
(58) Field of Classification Search
    CPC .... G06F 12/0246; G06F 3/061; G06F 3/0659; G06F 3/0679; G06F 13/1626; G06F 13/1642; G06F 15/167; G06F 13/1663
    USPC .......................................................... 711/103
    See application file for complete search history.

(56) References Cited

U.S. PATENT DOCUMENTS

| | | | |
|---|---|---|---|
| 9,704,593 B2* | 7/2017 | Nagai | G06F 13/1668 |
| 2012/0159086 A1* | 6/2012 | Cox | G06F 12/0888 |
| | | | 711/144 |
| 2017/0337966 A1 | 11/2017 | Kim et al. | |
| 2019/0317902 A1 | 10/2019 | Disegni et al. | |

(Continued)

FOREIGN PATENT DOCUMENTS

| | | |
|---|---|---|
| CN | 101187908 A | 5/2008 |
| CN | 102331977 A | 1/2012 |
| CN | 105302765 A | 2/2016 |

OTHER PUBLICATIONS

Extended European Search Report issued in EP21933583.3, dated Apr. 22, 2024, 8 pages.

(Continued)

*Primary Examiner* — Hua J Song

(57) ABSTRACT

Embodiments of the present disclosure disclose a flash memory access method and apparatus, and relate to the field of chips, so as to alleviate a problem in the conventional technology that a conflict occurs when a plurality of software subsystems running on one chip access a flash memory. An example solution is: The method is applied to a system on chip including an access controller and a plurality of processor cores, where the plurality of processor cores are separately connected to the access controller through a bus, a plurality of software subsystems run on the plurality of processor cores, different software subsystems run on different processor cores, and a power supply of the access controller is different from power supplies of the plurality of processor cores, or the access controller shares a power supply with a first processor core that runs a first software subsystem.

18 Claims, 12 Drawing Sheets

(56) References Cited

U.S. PATENT DOCUMENTS

2020/0310643 A1* 10/2020 Li ............................ G06F 3/061
2022/0066696 A1*  3/2022 Kang ..................... G06F 3/0659

OTHER PUBLICATIONS

International Search Report and Written Opinion issued in PCT/CN2021/083680, dated Aug. 16, 2021, 10 pages.

* cited by examiner

FLASH MEMORY ACCESS METHOD AND APPARATUS

CROSS-REFERENCE TO RELATED APPLICATIONS

This application is a continuation of International Application No. PCT/CN2021/083680, filed on Mar. 29, 2021, the disclosure of which is hereby incorporated by reference in its entirety.

TECHNICAL FIELD

Embodiments of the present disclosure relate to the field of chips, and in particular, to a flash memory access method and apparatus.

BACKGROUND

Nowadays, a system in an embedded device is increasingly complex. To reduce costs and power consumption of the device, a plurality of software subsystems may run on one chip. When a plurality of software subsystems runs on a chip, if the plurality of software subsystems runs on different processor cores of the chip respectively, a conflict may occur when the plurality of software subsystems accesses a same flash memory device, causing an exception of the software subsystem. Therefore, how the plurality of software subsystems running on a chip access a flash memory becomes an urgent problem to be resolved.

SUMMARY

Embodiments of the present disclosure provide a flash memory access method and apparatus, to avoid a problem that a conflict occurs when a plurality of software subsystems running on one chip access a same flash memory, thereby reducing costs of an embedded device.

To achieve the foregoing objectives, the following technical solutions are used in embodiments of the present disclosure.

According to a first aspect, an embodiment of the present disclosure provides a flash memory access method, applied to a system on chip (SoC), where the SoC includes an access controller and a plurality of processor cores, the plurality of processor cores are separately connected to the access controller through a bus, a plurality of software subsystems run on the plurality of processor cores, and different software subsystems run on different processor cores; a power supply of the access controller is different from power supplies of the plurality of processor cores, or the access controller shares a same power supply with a first processor core that runs a first software subsystem, and a power-on duration of the first processor core is greater than or equal to a preset duration; and the method includes: The access controller receives a plurality of access requests, where the plurality of access requests are used to request to access a same flash memory, and the plurality of access requests are access requests of the plurality of software subsystems; the access controller sorts the plurality of access requests based on a flash memory access policy; and the access controller sequentially processes the plurality of access requests based on a sorting sequence of the plurality of access requests.

Based on this solution, when the power supply of the access controller is different from the power supplies of the plurality of processor cores, because the access controller has an independent power supply, the access controller can be independently powered on and powered off, that is, when any software subsystem is started, the access controller can be started with the software subsystem. Therefore, any software subsystem can independently access a flash memory device through the access controller after being started. In addition, because the access controller may sort and sequentially process the access requests of the plurality of software subsystems, no conflict occurs when the plurality of software subsystems simultaneously access the flash memory device. Therefore, in this solution, the plurality of software subsystems can independently access a same flash memory device without configuring a flash memory controller or a flash memory device for each of the plurality of software subsystems, and no conflict occurs when the plurality of software subsystems simultaneously accesses the flash memory device, thereby reducing a chip area, and reducing chip costs and costs of an embedded device.

Based on this solution, when the access controller and the first software subsystem are simultaneously powered on and powered off, because the first software subsystem is powered on for a long time, the access controller is also in a power-on state for a long time. Therefore, another software subsystem may independently access the flash memory device through the access controller. In addition, because the access controller may sort and sequentially process the access requests of the plurality of software subsystems, no conflict occurs when the plurality of software subsystems simultaneously access the flash memory device. Therefore, in this solution, the plurality of software subsystems can independently access a same flash memory device without configuring a flash memory controller or a flash memory device for each of the plurality of software subsystems, and no conflict occurs when the plurality of software subsystems simultaneously accesses the flash memory device, thereby reducing a chip area, and reducing chip costs and costs of an embedded device.

It should be noted that because a processor core that runs each software subsystem may be connected to the access controller through the bus, when the access controller and the first software subsystem are simultaneously powered on and powered off, the first software subsystem does not exclusively occupy the flash memory device, and another software subsystem may also independently access the flash memory device through the flash memory controller.

In a possible implementation, the plurality of access requests includes a first access request and a second access request, the first access request is an access request of the first software subsystem, and the second access request is an access request of a second software subsystem. The first software subsystem and the second software subsystem run on different processor cores of the chip, a sorting sequence of the first access request precedes a sorting sequence of the second access request, and that the access controller sequentially processes the plurality of access requests based on the sorting sequence of the plurality of access requests includes: The access controller executes the first access request in the flash memory, and adds the second access request to a cache queue; and the access controller executes the second access request in the flash memory after processing the first access request.

Based on this solution, the access controller may first process the 1st access request based on the sorting sequence of the plurality of access requests, add another access request to the cache queue, and process a next access request after the 1st access request is processed, so that when the plurality of software subsystems simultaneously access a same flash memory, the access controller may process the access requests one by one based on an access policy. Therefore, no conflict occurs when the plurality of software subsystems simultaneously accesses the flash device.

In a possible implementation, the plurality of access requests includes a first access request and a second access request, the first access request is an access request of the first software subsystem, and the second access request is an access request of a second software subsystem. The first software subsystem and the second software subsystem run on different processor cores of the chip. The access controller includes an access arbitration apparatus and a flash memory controller, and that the access controller sequentially processes the plurality of access requests based on the sorting sequence of the plurality of access requests includes: The access arbitration apparatus sends the first access request to the flash memory controller, and adds the second access request to a cache queue; the flash memory controller receives the first access request, and executes the first access request in the flash memory; after the flash memory controller processes the first access request, the access arbitration apparatus sends the second access request to the flash memory controller; and the flash memory controller receives the second access request, and executes the second access request in the flash memory.

Based on this solution, the access arbitration apparatus may sequentially send the plurality of access requests to the flash memory controller based on the sorting sequence of the plurality of access requests, and the access arbitration apparatus may send the latter access request to the flash memory controller after the flash memory controller processes the former access request. Therefore, when the plurality of software subsystems simultaneously accesses a same flash memory, no conflict occurs on the access requests of the plurality of software subsystems.

Optionally, the access arbitration apparatus may learn, in an interruption manner or a query manner, whether the flash memory controller has processed the former access request.

With reference to the first aspect and the foregoing possible implementations, in another possible implementation, the first software subsystem is allowed to access a first address space in the flash memory, the second software subsystem is allowed to access a second address space in the flash memory, and an address in the first address space is not completely the same as an address in the second address space.

Optionally, when different software subsystems have a sharing requirement, the flash memory may include a shared address, and all the different software subsystems may access the shared address. When the different software subsystems have no sharing requirement, the different software subsystems are allowed to access different addresses.

Based on this solution, an address space of the flash memory accessed by each software subsystem is limited, occurrence of a misoperation among the plurality of software subsystems can be avoided, and secure and stable running of the plurality of software subsystems can be ensured.

In a possible implementation, the first access request includes a first destination address, the second access request includes a second destination address, and the method further includes: When determining that the first destination address does not belong to the address in the first address space, the access controller determines that the first access request is invalid; and/or when determining that the second destination address does not belong to the address in the second address space, the access controller determines that the second access request is invalid.

Based on this solution, the access controller may determine an address to be accessed by an access request of each software subsystem, and determine whether the address belongs to an address in an address space that the software subsystem is allowed to access. When the address does not belong to the address in the address space that the software subsystem is allowed to access, the access controller determines that the access request is invalid, and does not process the access request, thereby avoiding security degradation or an error of another software subsystem after the software subsystem performs an operation on the another software subsystem. Therefore, this solution can avoid a misoperation among the plurality of software subsystems, and ensure secure and stable running of the plurality of software subsystems.

In a possible implementation, at least one of the first address space or the second address space is a preset address space.

Based on this solution, an address space that each software subsystem is allowed to access in the flash memory may be preset. Therefore, when an address to be accessed by each software subsystem does not belong to the preset address space that the software subsystem is allowed to access, the access controller may determine that the access request is invalid. This can avoid a misoperation among the plurality of software subsystems, and ensure secure and stable running of the plurality of software subsystems.

In a possible implementation, an address range corresponding to the first address space and an address range corresponding to the second address space are stored in a one-time programmable memory.

Based on this solution, an address space of each software subsystem may be burned into a one time programmable chip (OTP) or a one time programmable memory (an electronic fuse, efuse) during production, so that the access controller can obtain, from the OTP or the efuse, the address space that each software subsystem is allowed to access, and determine, when an address to be accessed by each software subsystem does not belong to the preset address space that the software subsystem is allowed to access, that the access request is invalid, thereby avoiding a misoperation among the plurality of software subsystems and ensuring secure and stable running of plurality of software subsystems.

In a possible implementation, the first address space is a preset address space, and the second address space is an address space configured after the first software subsystem is started; or the second address space is a preset address space, and the first address space is an address space configured after the second software subsystem is started.

Based on this solution, the address space that each software subsystem is allowed to be access in the flash memory may be configured by a main control system. Because the main control system may dynamically configure, based on an actual service requirement, an address space that another software subsystem is allowed to access in the flash memory, the address space that each software subsystem is allowed to access is not fixed, and utilization of the flash memory can be improved.

In a possible implementation, the first address space includes a first default access address, and the second address space includes a second default access address. The first default access address is an address where the first software subsystem accesses the flash memory when being started, and the second default access address is an address where the second software subsystem accesses the flash memory when being started. The first default access address is different from the second default access address.

Based on this solution, because default access addresses when different software subsystems are started are different, no conflict occurs on the addresses accessed by different software subsystems when being started. In addition, because each software subsystem can independently access a Flash device during startup, each software subsystem can be independently started and work without depending on the main control system, thereby reducing system power consumption.

Optionally, for example, the first default access address is configured after the second software subsystem is started. The second software subsystem may be the main control system, and the second software subsystem may configure the first default access address based on factors such as a security factor, a size of the first software subsystem, a requirement of the first software subsystem, and a default access address of the second software subsystem.

In a possible implementation, the plurality of software subsystems includes an Android system and a drive system of a baseband.

Optionally, the drive system of the baseband is configured to drive a baseband chip to send and receive data.

In a possible implementation, the power supply of the access controller is different from a power supply of a processor core that runs the Android system and a power supply of a processor core that runs the drive system of the baseband.

It may be understood that, in an existing solution, the Android system exclusively occupies a flash memory device, and the Android system and the flash memory controller are simultaneously powered on and powered off. Only after the Android system is powered on, the drive system of the baseband can send an access request to the Android system, and access the flash memory device through the Android system. Therefore, the drive system of the baseband cannot independently access the flash memory device, and when the Android system is not powered on, the drive system of the baseband cannot access the flash memory device. However, in this solution, the access controller has an independent power supply, and can be independently powered on and powered off. Therefore, the access controller can be started with the Android system or the drive system of the baseband, so that after being started, the Android system or the drive system of the baseband can independently access the flash memory device through the access controller. In addition, because the access controller may sort and sequentially process access requests of the Android system or the drive system of the baseband, no conflict occurs when the Android system or the drive system of the baseband simultaneously accesses the flash memory device. Therefore, in this solution, the Android system and the baseband can independently access the flash memory device without configuring a flash memory controller or a flash memory device for each of the Android system and the baseband, and no conflict occurs when the Android system and the drive system of the baseband simultaneously access the flash memory device, thereby reducing a chip area, and reducing chip costs and costs of an embedded device.

In a possible implementation, the plurality of software subsystems includes a wireless fidelity Wi-Fi subsystem and a camera subsystem. Optionally, the Wi-Fi subsystem is configured to send and receive data.

In a possible implementation, the access controller shares a same power supply with a processor core that runs the Wi-Fi subsystem.

It may be understood that, in an existing solution, when the camera subsystem and the Wi-Fi subsystem access a same flash memory device, the Camera subsystem is a main control system, the flash memory controller and the Camera subsystem are simultaneously powered on and powered off, the Camera subsystem exclusively occupies the flash memory device after being powered on and started, and the Wi-Fi subsystem can access the flash memory device only through the Camera subsystem. Therefore, the Wi-Fi subsystem cannot independently access the flash memory. In addition, when the Camera subsystem is not powered on, the Wi-Fi subsystem cannot access the flash memory. However, in this solution, the access controller and the Wi-Fi subsystem are simultaneously powered on and powered off. Because the Wi-Fi subsystem needs to work for a long time to respond to a remote video viewing requirement on a mobile phone side, the access controller is always in a power-on state. When having an access requirement, the Camera subsystem may independently access the flash memory device through the access controller. In addition, because the access controller may sort and sequentially process access requests of the Camera subsystem and the Wi-Fi subsystem, no conflict occurs when the Camera subsystem and the Wi-Fi subsystem simultaneously access the flash memory device. Therefore, in this solution, the Camera subsystem and the Wi-Fi subsystem can access the flash memory device independently without configuring a flash memory controller or a flash memory device for each of the Camera subsystem and the Wi-Fi subsystem, and no conflict occurs when the Camera subsystem and the Wi-Fi subsystem simultaneously access the Flash device, thereby reducing a chip area, and reducing chip costs and costs of an embedded device.

It should be noted that in this solution, the processor core that runs the Camera subsystem and the processor core that runs the Wi-Fi subsystem are separately connected to the access controller through the bus. Therefore, when the access controller and the Wi-Fi subsystem are simultaneously powered on and powered off, the Wi-Fi subsystem does not exclusively occupy the flash memory device. After being powered on, the Camera subsystem can still independently access the flash memory device through the access controller.

In a possible implementation, an address at which the software subsystem accesses the flash memory when being started is a default access address, and default access addresses corresponding to a case in which the plurality of software subsystems are started are different from each other.

Based on this solution, because default access addresses when different software subsystems are started are different, no conflict occurs on the addresses accessed by different software subsystems when being started. In addition, because each software subsystem can independently access a Flash device during startup, each software subsystem can be independently started and work without depending on the main control system, thereby reducing system power consumption.

In a possible implementation, an address space that each software subsystem is allowed to access includes a Boot space and another space, an address range corresponding to the Boot space is stored in the one-time programmable memory, and the another space is an address space configured by the software subsystem.

Based on this solution, because the Boot space is small (for example, 1 Mb) and the another space is large (for example, 200 Mb), the chip needs to hard-code only the small Boot space, and the another large space is configured by using software, so that a chip design can be simplified. In addition, when the another space is configured by using the software, the software may dynamically configure, based on an actual service requirement, a size of the another space that each software subsystem is allowed to access, so that the size of the another space that each software subsystem is allowed to access is not fixed, thereby improving utilization of the flash memory.

Optionally, the Boot space and the another space that a same software subsystem is allowed to access may be adjacent spaces, or may be non-adjacent spaces in the flash memory device. Boot spaces that different software subsystems are allowed to access may be adjacent in the flash memory device.

In a possible implementation, the method further includes: When an access request of the software subsystem is beyond access permission, the access controller determines that the access request that is beyond the access permission is invalid, where the access permission includes read-only, write-only, erasable-only, read/write and non-erasable, readable and erasable but not writable, or writable and erasable but not readable.

Based on this solution, access permission of each software subsystem is limited. When an access request of the software subsystem is beyond the access permission, the access controller determines that the access request is invalid, so that security of the software subsystem can be further improved. Optionally, access permission of different software subsystems may be the same or may be different. This is not limited in this embodiment.

In a possible implementation, the method may further include: The processor core initializes the access controller and the flash memory based on a value of a first flag bit when determining that the access controller and the flash memory are not initialized, and sets the value of the first flag bit to a first value; or the processor core obtains initialization parameters of the access controller and the flash memory based on a value of a first flag bit when determining that the access controller and the flash memory have been initialized, where the value of the first flag bit includes the first value and a second value, the first value indicates that the access controller and the flash memory have been initialized, and the second value indicates that the access controller and the flash memory are not initialized.

For example, if a flag bit is 0, it indicates that the flash memory and the flash memory controller are not initialized, and if the flag bit is 1, it indicates that the flash memory and the flash memory controller have been initialized. When being powered on and started, the software subsystem reads a value of the flag bit, and determines, if the value of the flag bit is 0, that the flash memory and the flash memory controller are not initialized. In this case, the software subsystem initializes the flash memory and the flash memory controller when being powered on and started, and sets the flag bit to 1. When being powered on and started, the software subsystem reads the value of the flag bit as 1, and determines that the flash memory and the flash memory controller have been initialized. In this case, the software subsystem may directly read an initialized related parameter from the flash memory controller or a chip register, and does not need to initialize the flash memory and the flash memory controller again.

Based on this solution, a flag bit is set, so that when being powered on, each software subsystem can learn whether the flash memory and the flash memory controller have been initialized, and when the flash memory and the flash memory controller are not initialized, any software subsystem can initialize the flash memory and the flash memory controller, and when the plurality of software subsystems are powered on and started, the flash memory and the flash memory controller may be initialized only once, so that a problem such as an exception of the powered-on software subsystem or a data loss that is caused by a plurality of initializations can be avoided. However, in an existing solution, because the flash memory controller is exclusively occupied by the main control system, the main control system needs to initialize the flash memory and the flash memory controller when being started. However, because other software subsystems than the main control system cannot be in direct contact with the flash memory controller, initialization of the flash memory and the flash memory controller cannot be identified and controlled.

In a possible implementation, the flash memory access policy includes at least one of processing the access requests based on priorities of the software subsystems, processing the access requests based on priorities of the access requests, or processing the access requests based on a time sequence of the access requests.

Based on this solution, the access requests of the plurality of software subsystems may be sorted based on at least one of the priorities of the software subsystems, the priorities of the access requests, or the time sequence of the access requests, and the access requests of the plurality of software subsystems are sequentially processed based on the sorting sequence, so that no conflict occurs when the plurality of software subsystems running on one chip access a same flash memory. In addition, when accessing a same flash memory, the plurality of software subsystems in this solution do not need to depend on other software subsystems, and each software subsystem can independently access the flash memory. Therefore, implementation of the software subsystem is simple, and system power consumption can be reduced.

According to a second aspect, an embodiment of the present disclosure provides a flash memory access apparatus, where the flash memory access apparatus includes an access controller and plurality of processor cores, the plurality of processor cores are separately connected to the access controller through a bus, a plurality of software subsystems run on the plurality of processor cores, and different software subsystems run on different processor cores. A power supply of the access controller is different from power supplies of the plurality of processor cores, or the access controller shares a same power supply with a first processor core that runs a first software subsystem, and a power-on duration of the first processor core is greater than or equal to a preset duration. The plurality of processor cores is configured to send a plurality of access requests to the access controller, where the plurality of access requests are access requests of the plurality of software subsystems, and the plurality of access requests are used to request to access a same flash memory. The access controller is configured to receive the plurality of access requests, and sort the plurality of access requests based on a flash memory access policy; and sequentially process the plurality of access requests based on a sorting sequence of the plurality of access requests.

In a possible implementation, the plurality of access requests includes a first access request and a second access request, where the first access request is an access request of the first software subsystem, the second access request is an access request of a second software subsystem, and a sorting sequence of the first access request precedes a sorting sequence of the second access request. The access controller is specifically configured to: execute the first access request in the flash memory, and add the second access request to a cache queue; and execute the second access request in the flash memory after processing the first access request.

In a possible implementation, the plurality of access requests include a first access request and a second access request, where the first access request is an access request of the first software subsystem, the second access request is an access request of a second software subsystem, the access controller includes an access arbitration apparatus and a flash memory controller, and a sorting sequence of the first access request precedes a sorting sequence of the second access request. The access arbitration apparatus is configured to send the first access request to the flash memory controller, and add the second access request to a cache queue. The flash memory controller is configured to receive the first access request, and execute the first access request in the flash memory. The access arbitration apparatus is further configured to send the second access request to the flash memory controller after the flash memory controller processes the first access request. The flash memory controller is further configured to receive the second access request, and execute the second access request in the flash memory.

In a possible implementation, the first software subsystem is allowed to access a first address space in the flash memory, the second software subsystem is allowed to access a second address space in the flash memory, and an address in the first address space is not completely the same as an address in the second address space.

In a possible implementation, the first access request includes a first destination address, the second access request includes a second destination address, and the access controller is further configured to: when determining that the first destination address does not belong to the address in the first address space, determine that the first access request is invalid; and/or when determining that the second destination address does not belong to the address in the second address space, determine that the second access request is invalid.

In a possible implementation, at least one of the first address space or the second address space is a preset address space.

In a possible implementation, an address range corresponding to the first address space and an address range corresponding to the second address space are stored in a one-time programmable memory.

In a possible implementation, the first address space is a preset address space, and the second address space is an address space configured after the first software subsystem is started; or the second address space is a preset address space, and the first address space is an address space configured after the second software subsystem is started.

In a possible implementation, the first address space includes a first default access address, and the second address space includes a second default access address. The first default access address is an address where the first software subsystem accesses the flash memory when being started, and the second default access address is an address where the second software subsystem accesses the flash memory when being started. The first default access address is different from the second default access address.

In a possible implementation, the first software subsystem is an Android system and the second software subsystem is a drive system of a baseband.

In a possible implementation, the power supply of the access controller is different from a power supply of a processor core that runs the Android system and a power supply of a processor core that runs the drive system of the baseband.

In a possible implementation, the first software subsystem is a wireless fidelity Wi-Fi subsystem and the second software subsystem is a camera subsystem.

In a possible implementation, the access controller shares a same power supply with a processor core that runs the Wi-Fi subsystem.

In a possible implementation, an address at which the software subsystem accesses the flash memory when being started is a default access address, and default access addresses corresponding to a case in which the plurality of software subsystems are started are different from each other.

In a possible implementation, the access controller is further configured to: when an access request of the software subsystem is beyond access permission, determine, by the access controller, that the access request that is beyond the access permission is invalid, where the access permission includes read-only, write-only, erasable-only, read/write and non-erasable, readable and erasable but not writable, or writable and erasable but not readable.

In a possible implementation, the processor core is further configured to: initialize, based on a value of a first flag bit, the access controller and the flash memory when determining that the access controller and the flash memory are not initialized, and reset the value of the first flag bit to a first value; or obtain, based on a first flag bit, initialization parameters of the access controller and the flash memory when determining that the access controller and the flash memory have been initialized, where the value of the first flag bit includes the first value and a second value, the first value indicates that the access controller and the flash memory have been initialized, and the second value indicates that the access controller and the flash memory are not initialized.

In a possible implementation, the flash memory access policy includes at least one of processing the access requests based on priorities of the software subsystems, processing the access requests based on priorities of the access requests, or processing the access requests based on a time sequence of the access requests.

For effect descriptions of the second aspect, refer to the effect descriptions of the first aspect. Details are not described herein again.

According to a third aspect, an embodiment of the present disclosure provides an electronic device. The electronic device includes a flash memory device and the flash memory access apparatus according to any implementation of the second aspect.

According to a fourth aspect, an embodiment of the present disclosure provides a flash memory access method, applied to a system on chip (SoC), where the SoC includes an access controller and a plurality of processor cores, the plurality of processor cores are separately connected to the access controller through a bus, a plurality of software subsystems run on the plurality of processor cores, and different software subsystems run on different processor cores. A power supply of the access controller is different from power supplies of the plurality of processor cores, or the access controller shares a same power supply with a first processor core that runs a first software subsystem, and a power-on duration of the first processor core is greater than or equal to a preset duration. The method includes: The access controller receives a plurality of access requests, where the plurality of access requests is used to request to access a same flash memory, and the plurality of access requests are access requests of the plurality of software subsystems; and the access controller determines whether an access request of each software subsystem belongs to an address in an address space that the software subsystem allowed to access. When determining that the address to be accessed by the access request belongs to the address in the address space that the software subsystem allowed to access, the access controller may further determine whether the access request is beyond access permission. When the access request is not beyond the access permission, the flash memory controller adds the access request to a cache queue based on a flash memory access policy, and processes the access request in sequence.

Based on this solution, when the power supply of the access controller is different from the power supplies of the plurality of processor cores, because the access controller has an independent power supply, the access controller can be independently powered on and powered off. Therefore, any software subsystem can independently access a flash memory device through the access controller after being started. When the access controller and the first software subsystem are simultaneously powered on and powered off, because the first software subsystem is powered on for a long time, the access controller is also in a power-on state for a long time. Therefore, another software subsystem may independently access the flash memory device through the access controller. In addition, because the access controller may sort and sequentially process access requests that are not beyond the address spaces that the software subsystems are allowed to access and that are not beyond the access permission in the access requests of the plurality of software subsystems, no conflict occurs when the plurality of software subsystems simultaneously access the flash memory device. Therefore, in this solution, the plurality of software subsystems can independently access a same flash memory device without configuring a flash memory controller or a flash memory device for each of the plurality of software subsystems, and no conflict occurs when the plurality of software subsystems simultaneously accesses the flash memory device, thereby reducing a chip area, and reducing chip costs and costs of an embedded device. In addition, a misoperation among the plurality of software subsystems can be avoided, and secure and stable running of the plurality of software subsystems can be ensured.

It should be noted that because a processor core that runs each software subsystem may be connected to the access controller through the bus, when the access controller and the first software subsystem are simultaneously powered on and powered off, the first software subsystem does not exclusively occupy the flash memory device, and another software subsystem may also independently access the flash memory device through the flash memory controller.

In a possible implementation, when each software subsystem is started, a processor core that runs the software subsystem may determine, based on a value of a first flag bit, whether the access controller and the flash memory have been initialized, and initialize the access controller and the flash memory when determining that the access controller and the flash memory are not initialized and reset the value of the first flag bit to a first value; or obtain initialization parameters of the access controller and the flash memory when determining that the access controller and the flash memory have been initialized.

Based on this solution, a flag bit is set, so that when being powered on, each software subsystem can learn whether the flash memory and the flash memory controller have been initialized, and when the flash memory and the flash memory controller are not initialized, any software subsystem can initialize the flash memory and the flash memory controller, and when the plurality of software subsystems is powered on and started, the flash memory and the flash memory controller may be initialized only once, so that a problem such as an exception of the powered-on software subsystem or a data loss that is caused by a plurality of initializations can be avoided. However, in an existing solution, because the flash memory controller is exclusively occupied by the main control system, the main control system needs to initialize the flash memory and the flash memory controller when being started. However, because software subsystems other than the main control system cannot be in direct contact with the flash memory controller, initialization of the flash memory and the flash memory controller cannot be identified and controlled.

DESCRIPTION OF EMBODIMENTS

Figure 1:
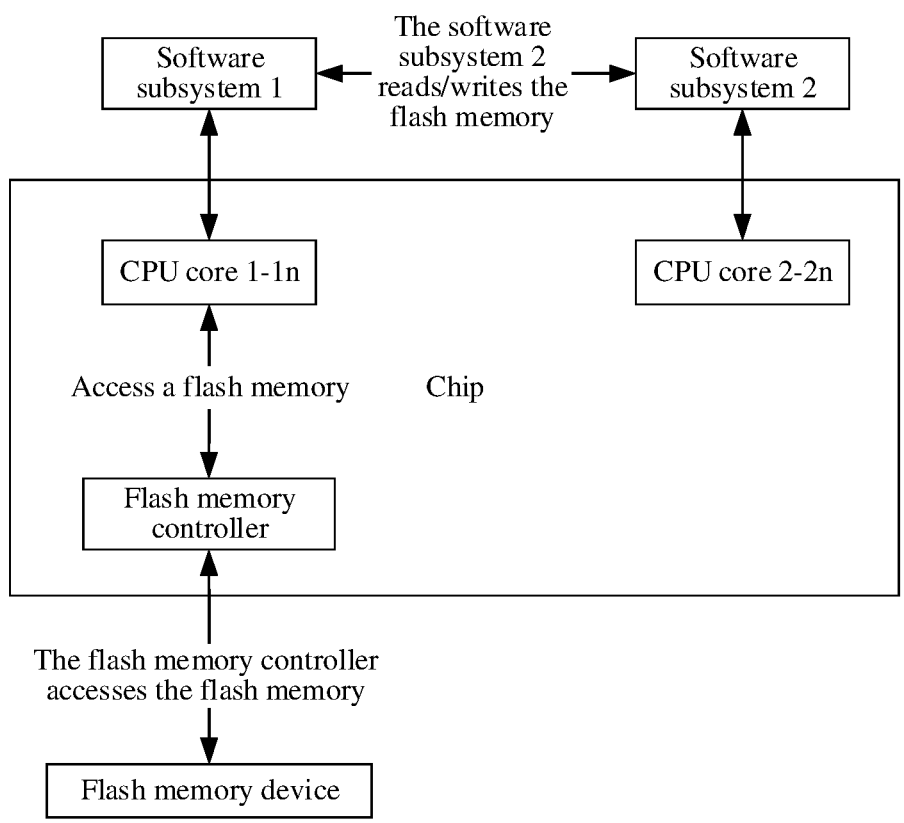
FIG. 1 is a schematic diagram of a structure in which a plurality of software subsystems accesses a flash memory according to an embodiment of the present disclosure.

The following describes the technical solutions in embodiments of the present disclosure with reference to the accompanying drawings in embodiments of the present disclosure. In the present disclosure, "at least one" means one or more, and "a plurality of" means two or more. The term "and/or" is an association relationship for describing associated objects and represents that three relationships may exist. For example, A and/or B may represent one of the following three cases: Only A exists, both A and B exist, and only B exists, where A and B may be singular or plural. A character "/" generally indicates an "or" relationship between the associated objects. At least one of the following items (pieces) or a similar expression thereof refers to any combination of these items, including any combination of singular items (pieces) or plural items (pieces). For example, at least one of a, b, or c may represent: a, b, c, a and b, a and c, b and c, or a, b, and c, where a, b, and c may be singular or plural. In addition, to clearly describe the technical solutions in embodiments of the present disclosure, terms such as "first" and "second" are used in embodiments of the present disclosure to distinguish between same items or similar items that provide basically same functions or purposes. A person skilled in the art may understand that the terms such as "first" and "second" do not limit a quantity and an execution sequence. For example, "first" in a first access request and "second" in a second access request in embodiments of the present disclosure are merely used to distinguish different access requests. Descriptions such as "first" and "second" in embodiments of the present disclosure are merely used for indicating and distinguishing between described objects, do not show a sequence, do not indicate a specific limitation on a quantity of devices in embodiments of the present disclosure, and cannot constitute any limitation on embodiments of the present disclosure.

It should be noted that in the present disclosure, the terms such as "example" or "for example" are used to represent giving an example, an illustration, or a description. Any embodiment or design scheme described as "an example" or "for example" in the present disclosure should not be construed as being more preferable or advantageous than other embodiments or design schemes. To be precise, the word such as "example" or "for example" is intended to present a related concept in a specific manner.

In an embedded device, a plurality of software subsystems may be integrated on a same chip, so that the plurality of software subsystems may run on the same chip. When a plurality of software subsystems simultaneously run on a chip, if the plurality of software subsystems respectively run on different processor cores of the chip, a conflict may occur when the plurality of software subsystems accesses a same flash memory Flash device, which causes a case that the software subsystems cannot run normally.

For example, when the chip includes only one Flash controller, if the plurality of software subsystems request to access a same flash device simultaneously, because the Flash controller cannot simultaneously process access requests of the plurality of software subsystems, a packet loss of access requests sent by some software subsystems may be caused, causing an exception of the software subsystem, an exception of the Flash controller, or even a crash of the software subsystem. For another example, when the chip includes only one Flash controller, if access requests of the plurality of software subsystems simultaneously request to perform an access operation on a same address in a same Flash device, a conflict may occur between the access requests of the plurality of software subsystems, causing an exception of the software subsystem. Therefore, how the plurality of software subsystems running on a chip access a Flash becomes an urgent problem to be solved.

FIG. 1 is a schematic diagram of a structure in which a plurality of software subsystems accesses a flash memory. As shown in FIG. 1, a software subsystem 1 and a software subsystem 2 run on a same chip. The software subsystem 1 runs on a central processing unit (CPU) core 1-1n, and the software subsystem 2 runs on a CPU core 2-2n. Optionally, operating systems (OS) of the software subsystem 1 and the software subsystem 2 may be a same operating system, or may be different operating systems. This is not limited in embodiments of the present disclosure. For example, the operating system of the software subsystem 1 or the software subsystem 2 may be an operating system such as Android, Linux, or a real-time operating system (RTOS). This is not limited in embodiments of the present disclosure.

As shown in FIG. 1, the software subsystem 1 is a main control system, and the main control system exclusively occupies a Flash device. The software subsystem 1 may directly access the flash memory Flash device through a flash memory Flash controller, and the software subsystem 2 can access the flash memory Flash device by using a proxy of the software subsystem 1. In this solution, although two software subsystems can access the same flash memory device, the other software subsystem needs to access the flash memory device through a proxy of the main control system when accessing the flash memory device. Therefore, the software subsystem 2 in this solution cannot access the flash memory device independently, which causes a complex design of a plurality of software subsystems.

For example, a battery-type camera includes a Camera subsystem and a wireless fidelity (Wi-Fi) subsystem, and a Camera chip and a Wi-Fi chip are integrated into one chip. When the Camera subsystem and the Wi-Fi subsystem access a same flash memory device, the Camera subsystem is a main control system. After being powered on and started, the Camera subsystem exclusively occupies the Flash device, and the Wi-Fi subsystem can access the Flash device only through the Camera subsystem. Optionally, the battery-type Camera may include devices such as a battery-type visual doorbell, a battery-type visual peehole, and a smart door lock.

For another example, a terminal device includes an Android system and a drive system of a baseband. When the Android system and the drive system of the baseband access a same flash memory device, the Android system is a main control system. After being powered on and started, the Android system exclusively occupies the Flash device. If the baseband wants to access the Flash device, the baseband needs to send data to the Android system, and the Android system replaces for accessing the Flash device. That is, the drive system of the baseband cannot independently access the Flash device, and can access the Flash device only through the Android system.

For example, when a plurality of software subsystems shares a same Flash device, a main control system exclusively occupies the Flash device. In addition, because the flash memory controller and the main control system are simultaneously powered on and powered off, if the main control system is not powered on, another software subsystem cannot access the flash memory device. The another software subsystem can access the flash memory device through the main control system only after the main control system is powered on and started. That is, the Flash controller can only be powered on and powered off with the main control system. Therefore, when the main control system is not powered on, another software subsystem cannot independently access the Flash device.

Figure 2:
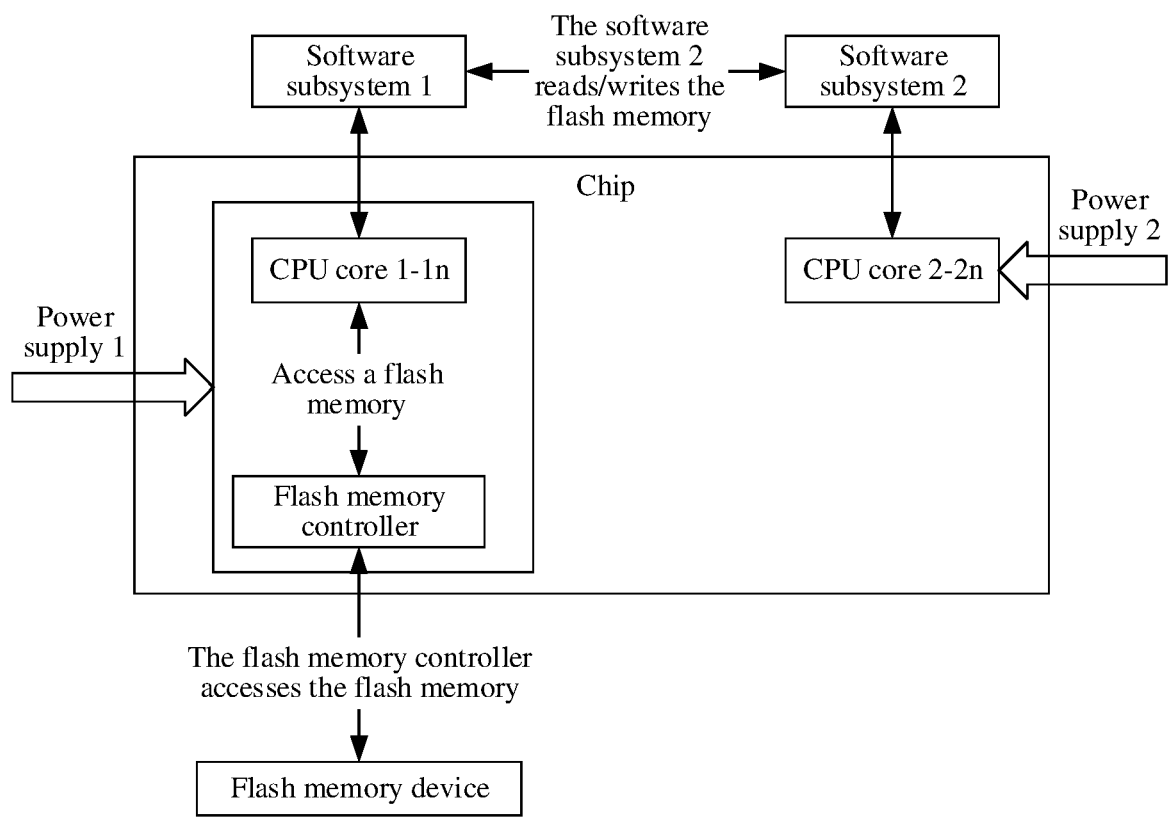
FIG. 2 is a schematic diagram of a power supply solution in which plurality of software subsystems access a flash memory according to an embodiment of the present disclosure.

For example, FIG. 2 is a power supply solution of a chip. As shown in FIG. 2, the software subsystem 1 running on the CPU core 1-1n is the main control system. The CPU core 1-1n and the flash memory controller are powered by a same power supply 1, and the CPU core 2-2n is powered by a power supply 2. Because power supplies of the CPU core 1-1n and the flash memory controller are the same, the flash memory controller is powered on and powered off with the software subsystem 1. When the software subsystem 1 is not powered on, the flash memory controller cannot be powered on. Therefore, the software subsystem 2 cannot access the Flash device.

For example, a battery-type Camera includes a Camera subsystem and a Wi-Fi subsystem, a Camera chip is a main control system, power supplies of the Camera chip and a Flash controller are the same, a Wi-Fi chip is powered by another power supply, and the Flash controller and the Camera subsystem are simultaneously powered on and powered off. The Camera subsystem is powered on and works only when necessary, and the Wi-Fi subsystem needs to work for a long time to respond to a remote video viewing requirement on a mobile phone side. Therefore, when the Camera subsystem is not powered on, the Flash controller is also not powered on. Therefore, the Wi-Fi subsystem cannot access the Flash device. In addition, after being powered on, the Camera subsystem exclusively occupies the flash memory device, and the Wi-Fi subsystem needs to access the flash memory device through the Camera subsystem. Therefore, the Wi-Fi subsystem cannot independently access the flash memory device.

For another example, a mobile phone includes an Android system and a drive system of a baseband. The Android system exclusively occupies a Flash device. A processor that runs the Android system and a Flash controller are simultaneously powered on and powered off. Therefore, when the Android system is not powered on, the Flash controller is also not powered on, and the drive system of the baseband cannot independently access the Flash device.

Figure 3:
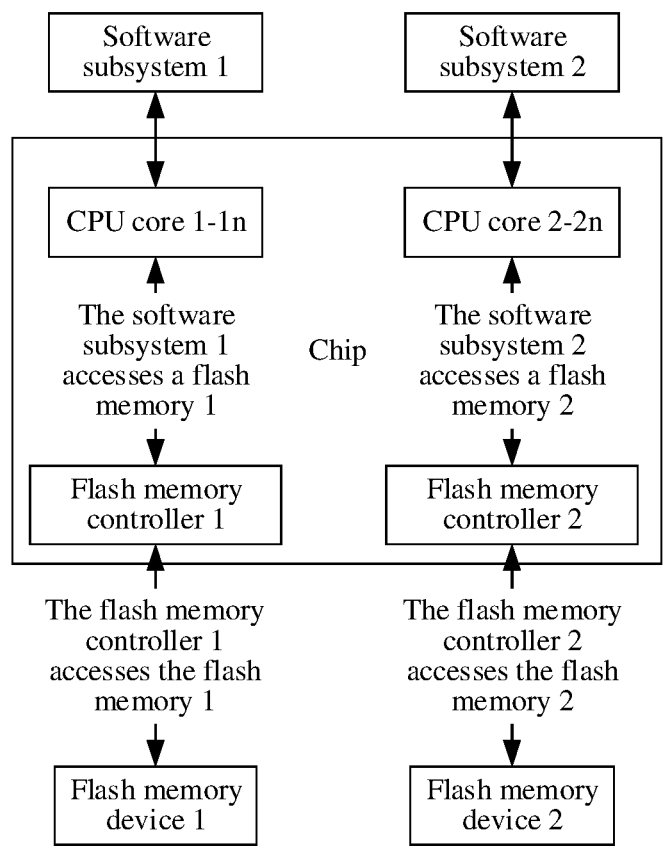
FIG. 3 is a schematic diagram of another structure in which a plurality of software subsystems accesses a flash memory according to an embodiment of the present disclosure.

FIG. 3 is a schematic diagram of another structure in which a plurality of software subsystems accesses a flash memory. As shown in FIG. 3, an example in which a software subsystem 1 and a software subsystem 2 run on one chip is used. In this solution, two flash memory controllers are disposed in the chip, the software subsystem 1 implements access driving for a flash memory device 1 through the flash memory controller 1, and the software subsystem 2 implements access driving for a flash memory device 2 through the flash memory controller 2. That is, each software subsystem accesses a corresponding flash memory device through a corresponding flash memory control. In this solution, although a plurality of software subsystems can independently access flash memory devices through respective flash memory controllers, the flash memory devices accessed by the plurality of software subsystems are not a same flash memory device. Therefore, a plurality of flash memory devices needs to be disposed for different software subsystems to access with high costs. In addition, the solution requires a flash memory controller for each software subsystem, which increases a chip area.

For example, a battery-type camera includes a Camera subsystem and a Wi-Fi subsystem, and the Camera subsystem and the Wi-Fi subsystem each have an independent Flash controller and Flash device. The Camera subsystem may implement access driving for the flash memory device 1 through the flash memory controller 1 of the Camera subsystem, and the Wi-Fi subsystem may implement access driving for the flash memory device 2 through the flash memory controller 2 of the Wi-Fi subsystem. However, in this solution, a flash memory device needs to be added for the Wi-Fi subsystem, resulting in high costs. In addition, a flash memory controller needs to be added for the Wi-Fi subsystem, which increases a chip area.

To alleviate a problem that a plurality of software subsystems cannot independently access a same flash memory device, an embodiment of the present disclosure provides a flash memory access method, so that a conflict can be avoided when a plurality of software subsystems running on one chip accesses a flash memory. In addition, according to the method, the plurality of software subsystems running on the chip can independently access a same flash memory device without adding a flash memory controller or a flash memory device, thereby reducing a chip area and reducing chip costs and costs of an embedded device.

Figure 4:
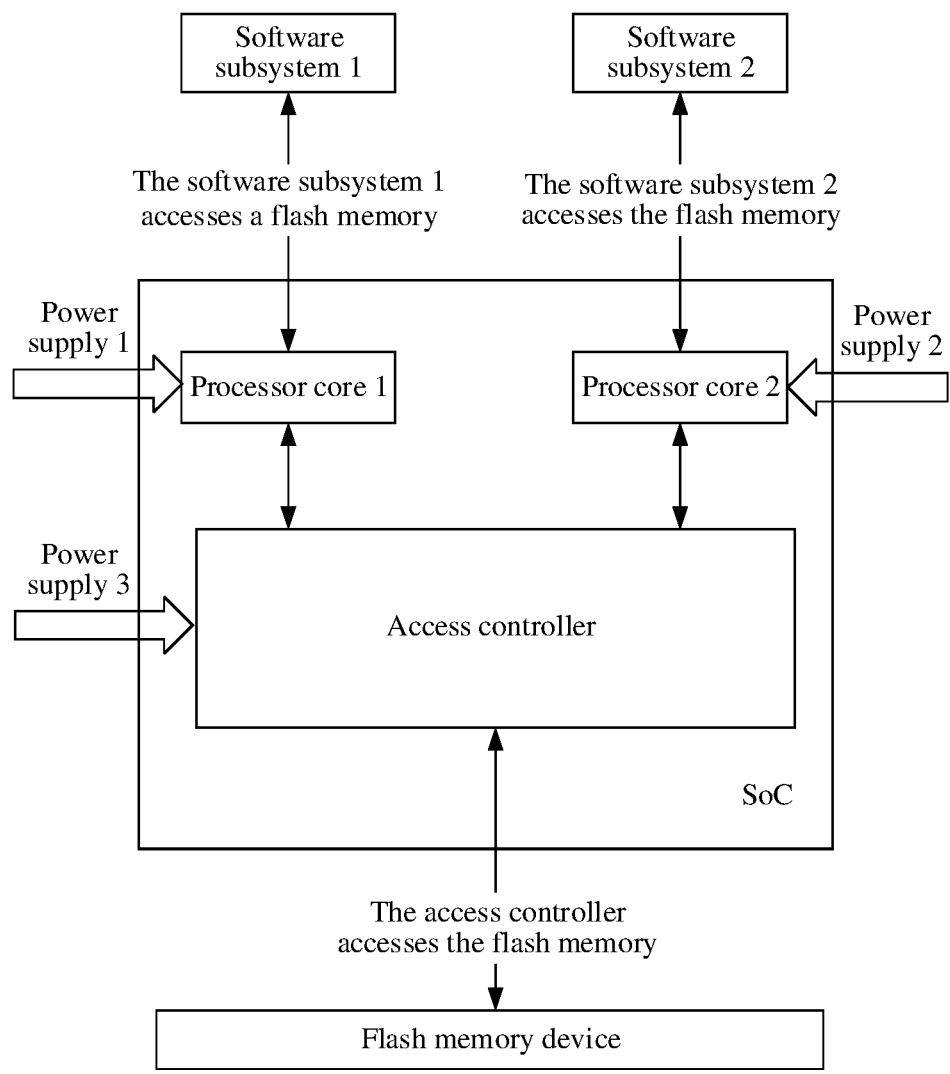
FIG. 4 is a schematic diagram of a system architecture in which a plurality of software subsystems accesses a flash memory according to an embodiment of the present disclosure.

The flash memory access method provided in this embodiment may be applied to a system architecture shown in FIG. 4. As shown in FIG. 4, a plurality of software subsystems may simultaneously run on a system on chip (SoC), and the plurality of software subsystems may request to access a same flash memory device.

The SoC chip includes an access controller and a plurality of processor cores. A plurality of software subsystems run on the plurality of processor cores, and different software subsystems run on different processor cores. The plurality of processor cores is connected to the access controller through a bus.

The access controller is configured to sort access requests of the plurality of software subsystems based on a flash memory access policy when the plurality of software subsystems access a same flash memory device; and then sequentially process the access requests of the plurality of software subsystem based on a sorting sequence.

For example, as shown in FIG. 4, an example in which the SoC chip includes two processor cores: a processor core 1 and a processor core 2 is used. A software subsystem 1 runs on the processor core 1, a software subsystem 2 runs on the processor core 2, and the processor core 1 and the processor core 2 are separately connected to the access controller through a bus. That is, the SoC chip may simultaneously run two software subsystems, and the two software subsystems respectively run on different processor cores in the SoC chip.

Optionally, one software subsystem may run on one processor core, or may run on a plurality of processor cores. This is not limited in this embodiment. In FIG. 4, only an example in which one software subsystem runs on one processor core is used for illustration. Operating systems of the two software subsystems shown in FIG. 4 may be the same or different. This is not limited in this embodiment.

Optionally, in an implementation, a power supply of the access controller is different from power supplies of the plurality of processor cores. For example, as shown in FIG. 4, the power supply of the processor core 1 that runs the software subsystem 1 is a power supply 1, the power supply of the processor core 2 that runs the software subsystem 2 is a power supply 2, and the power supply of the access controller is a power supply 3. That is, the power supply of the access controller is an independent power supply, and the access controller may be independently powered on and powered off through the power supply 3, so that the access controller may be powered on after any software subsystem is powered on. That is, the access controller may be powered on and powered off with any software subsystem, so that each software subsystem can independently access a Flash device.

It may be understood that because the access controller in this implementation can be independently powered on and powered off, that is, when any software subsystem is started, the access controller can be started with the software subsystem. Therefore, any software subsystem can independently access a flash memory device through the access controller after being started. In addition, because the access controller may sort and sequentially process the access requests of the plurality of software subsystems, no conflict occurs when the plurality of software subsystems simultaneously access the flash memory device. Therefore, in this solution, the plurality of software subsystems can independently access a same flash memory device without configuring a flash memory controller or a flash memory device for each of the plurality of software subsystems, and no conflict occurs when the plurality of software subsystems simultaneously accesses the flash memory device, thereby reducing a chip area, and reducing chip costs and costs of an embedded device.

Optionally, in another implementation, the access controller and a first processor core that runs a first software subsystem share a same power supply, and a power-on duration of the first processor core is greater than or equal to a preset duration. That is, the access controller and the first software subsystem that runs for a long time may be simultaneously powered on and powered off.

Figure 5:
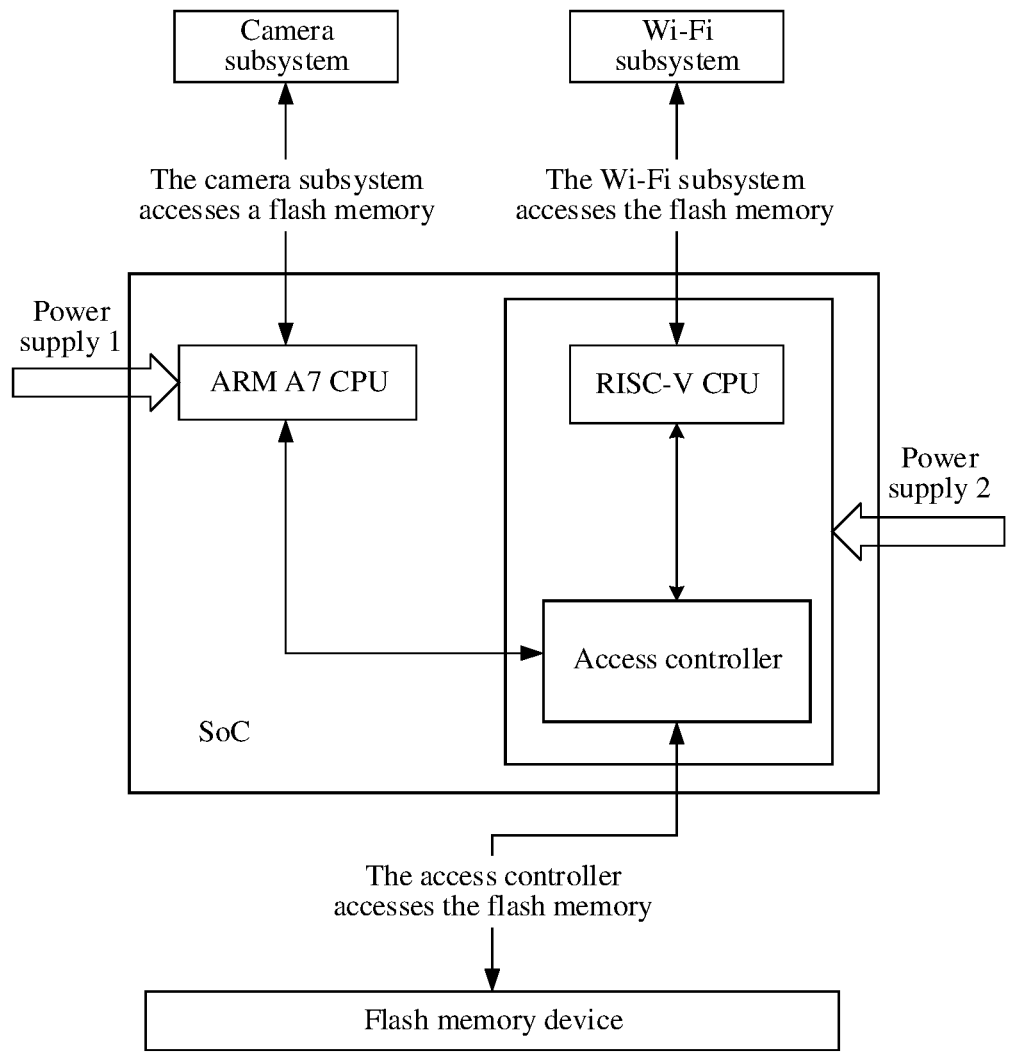
FIG. 5 is a schematic diagram of another system architecture in which a plurality of software subsystems accesses a flash memory according to an embodiment of the present disclosure.

For example, as shown in FIG. 5, the SoC chip includes a reduced instruction set processor architecture (advanced RISC machine, ARM) A7 CPU and a reduced instruction set computer (reduced instruction set computer, RISC-V) CPU. A camera subsystem runs on the ARM A7 CPU, and a Wi-Fi subsystem runs on the RISC-V CPU. The Camera subsystem is powered on and works only when necessary, and the Wi-Fi subsystem needs to work for a long time to respond to a remote video viewing requirement on a mobile phone side. As shown in FIG. 5, the access controller and the RISC-V CPU that runs the Wi-Fi subsystem are powered through the same power supply 2, and the access controller and the Wi-Fi subsystem are powered on and powered off together. Because the Wi-Fi subsystem needs to work for a long time, the access controller is in a power-on state for a long time. In this way, after being powered on, the Camera subsystem can independently access a flash memory device through the access controller. This can reduce power supply costs compared with that the RISC-V CPU and the access controller use different power supplies. It may be understood that processor architectures of processor cores that run different software subsystems on a same chip may be the same or may be different. This is not limited in this embodiment. In FIG. 5, only an example of an ARM architecture and a RISC architecture is used for illustration.

It should be noted that because a processor core that runs each software subsystem may be connected to the access controller through the bus, when the access controller and the first software subsystem that runs for a long time are simultaneously powered on and powered off, the first software subsystem does not exclusively occupy the flash memory device, and another software subsystem may also independently access the flash memory device through the access controller after being powered on. For example, when the access controller and the Wi-Fi subsystem are simultaneously powered on and powered off, after being powered on, the Camera subsystem may independently access the flash memory device through the access controller.

It may be understood that, because the access controller in this implementation may be powered on and powered off together with the Wi-Fi subsystem that is used for a long time, the Camera subsystem may access the flash memory device through the access controller, and the Wi-Fi subsystem may also access the flash memory device through the access controller. The plurality of software subsystems can independently access the same flash memory device without configuring a flash memory controller or a flash memory device for each of the plurality of software subsystems, thereby reducing a chip area and reducing chip costs and costs of an embedded device. In addition, the access controller and the Wi-Fi subsystem are powered on and powered off together, so that power supply costs can be reduced.

Figure 6:
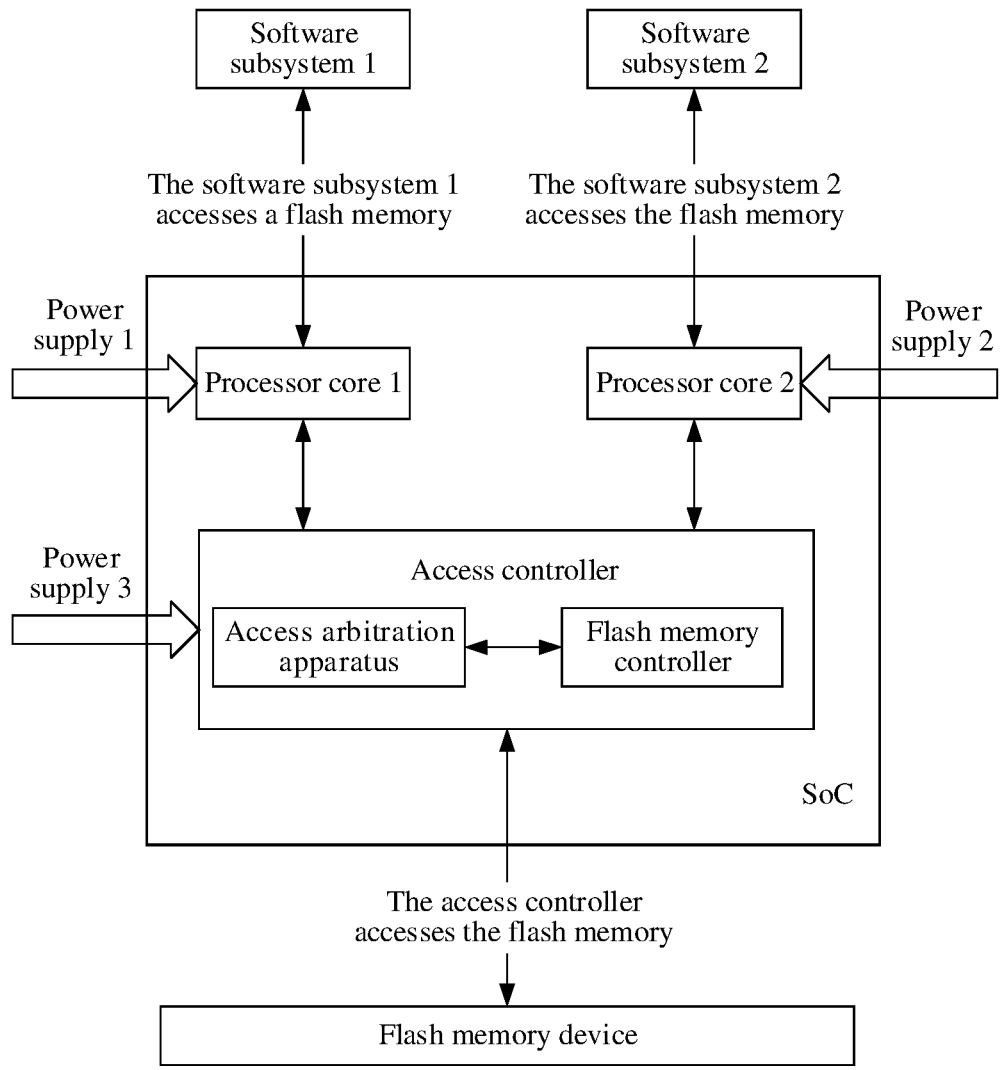
FIG. 6 is a schematic diagram of another system architecture in which a plurality of software subsystems accesses a flash memory according to an embodiment of the present disclosure.

Optionally, as shown in FIG. 6, the access controller may include an access arbitration apparatus and a flash memory controller. The access arbitration apparatus is configured to receive the access requests of the plurality of software subsystems, sort the access requests of the plurality of software subsystems based on the flash memory access policy, and sequentially send the access requests of the plurality of software subsystems to the flash memory controller based on the sorting sequence.

The access arbitration apparatus is further configured to send a 1st access request to the flash memory controller based on the sorting sequence of the access requests of the plurality of software subsystems, and add another access request to the cache queue; and send a next access request to the flash memory controller based on the sorting sequence after the flash memory controller processes the 1st access request.

The flash memory controller is configured to receive the access request from the access arbitration apparatus and execute the received access request in the flash memory.

As shown in FIG. 6, when the access controller includes the access arbitration apparatus and the flash memory controller, power supplies of the access arbitration apparatus and the flash memory controller are the power supply 3, and the power supply 3 is independent of power supplies of other processor cores in the SoC chip. Therefore, the access arbitration apparatus and the flash memory controller may be powered on and powered off with any software subsystem, and the plurality of software subsystems can independently access the same flash memory device without configuring a flash memory controller or a flash memory device for each of the plurality of software subsystems, thereby reducing a chip area and reducing chip costs and costs of an embedded device. In addition, the access arbitration apparatus sorts the plurality of access requests based on the flash memory access policy, and then sequentially sends the plurality of access requests to the flash memory controller based on the sorting sequence of the plurality of access requests, so that the flash memory controller receives only one access request each time, and processes the access request received by the flash memory controller, thereby avoiding a conflict when the plurality of software subsystems access the same flash memory.

Figure 7:
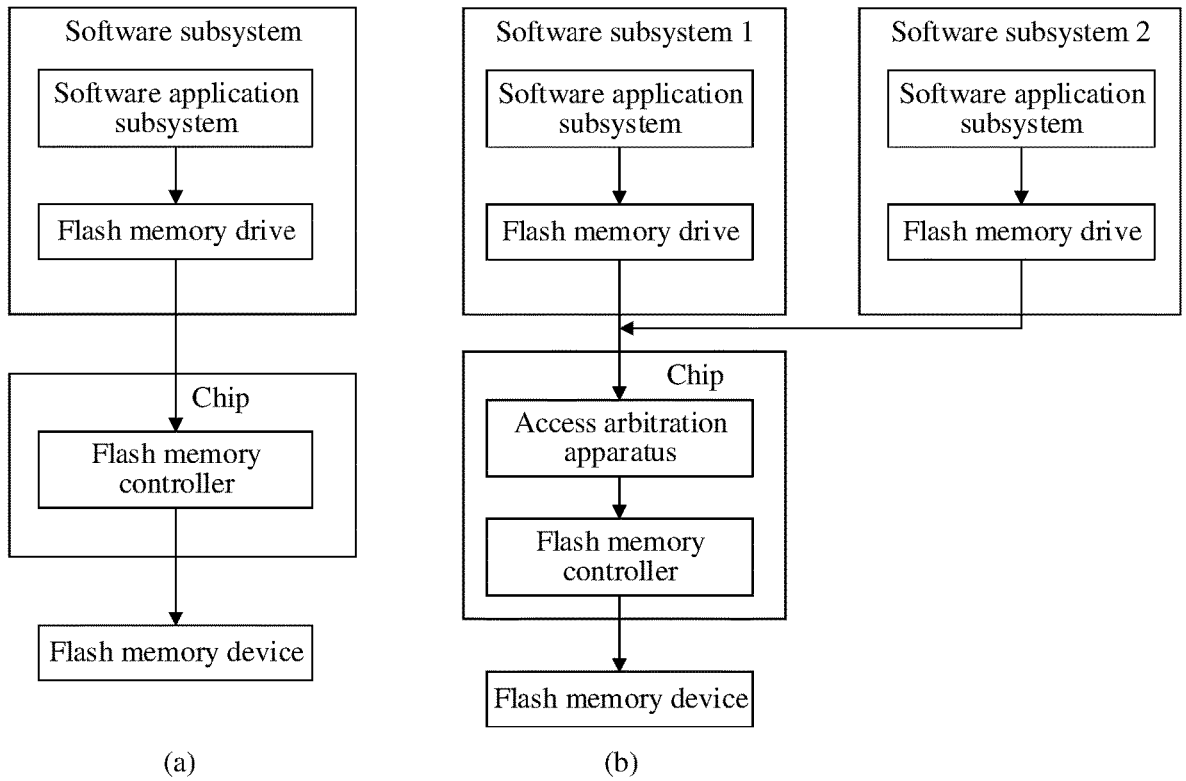
FIG. 7 is a schematic diagram of a structure of a software driver in which a plurality of software subsystems accesses a flash memory according to an embodiment of the present disclosure.

Optionally, FIG. 7 is a schematic diagram of a structure of a software driver according to an embodiment of the present disclosure. As shown in (a) in FIG. 7, when the architecture shown in FIG. 1 to FIG. 3 is used to access the flash memory device, a flash memory Flash driver of a software subsystem directly operates a Flash controller. When the architecture shown in FIG. 6 is used to access the flash memory device, because the access arbitration apparatus is added in the SoC chip, the Flash driver needs to be modified and adapted. The modified Flash driver does not directly operate the Flash controller, but first operates the access arbitration apparatus, and then operates the Flash controller. As shown in (b) in FIG. 7, the Flash driver of the software subsystem 1 and the Flash driver of the software subsystem 2 first operate the access arbitration apparatus in the SoC chip, and then operate the Flash controller, instead of directly operating the Flash controller, so that the plurality of access requests can be sorted through the access arbitration apparatus, thereby avoiding a conflict when the plurality of software subsystems access the same flash memory device.

Optionally, with reference to FIG. 4 to FIG. 7, an address where each of the plurality of software subsystems accesses the flash memory when being started may be a default access address, and default access addresses when different software subsystems are started may be different.

For example, the plurality of software subsystems includes a first software subsystem and a second software subsystem. An address where the first software subsystem accesses the flash memory when being started is a first default access address, an address where the second software subsystem accesses the flash memory when being started is a second default access address, and the first default access address and the second default access address are different addresses in the flash memory.

Optionally, the first software subsystem may be a Wi-Fi subsystem, and the second software subsystem is a camera subsystem. Alternatively, the first software subsystem may be an Android system, and the second software subsystem may be a drive system of a baseband.

Optionally, the default access address when each software subsystem is started may be a preset address, or may be configured after another software subsystem is started.

When the default access address when the software subsystem is started is the preset address, the preset address may be hard-coded in a chip, or may be stored in a one-time programmable memory. For example, the first default access address and the second default access address may be fixed in chip logic. For another example, the first default access address and the second default access address may be burned into a one-time programmable chip (OTP) or a one-time programmable memory (an electronic fuse, efuse) during production.

Optionally, the default access address when the software subsystem is started may be configured by a main control system, and a default access address when the main control system is started may be preset. For example, the default access address when the main control system is started is hard-coded in the chip. After being started, the main control system may configure a default access address for another software subsystem.

For example, the first default access address is configured after the second software subsystem is started. The second software subsystem may be the main control system, and the second software subsystem may configure the first default access address based on factors such as a security factor, a size of the first software subsystem, a requirement of the first software subsystem, and a default access address of the second software subsystem. A specific manner of configuring the first default access address and the second default access address is not limited in this embodiment. This is merely an example for description herein.

It may be understood that, by configuring a default access address when each software subsystem is started, default access addresses when different software subsystems are started are different, so that no conflict occurs on default access addresses when different software subsystems are started, and it is ensured that each software subsystem can be started independently. Compared with the flash memory access method shown in FIG. 1, in FIG. 1, when the software subsystem 1 is not started, the software subsystem 2 cannot be started independently. However, in this embodiment, each software subsystem can be started independently, and startup of each software subsystem may not depend on another software subsystem. Therefore, a plurality of software subsystems can be started and work independently of each other, thereby reducing system power consumption.

Optionally, the processor core is configured to determine, based on a value of a first flag bit, whether the access controller and the flash memory have been initialized; initialize the access controller and the flash memory when determining that the access controller and the flash memory are not initialized, and reset the value of the first flag bit to a first value; or obtain initialization parameters of the access controller and the flash memory when determining that the access controller and the flash memory have been initialized. The value of the first flag bit includes the first value and a second value, the first value indicates that the access controller and the flash memory have been initialized, and the second value indicates that the access controller and the flash memory are not initialized.

For example, a flag bit 0 indicates that the flash memory and the flash memory controller are not initialized, and a flag bit 1 indicates that the flash memory and the flash memory controller have been initialized. When being powered on and started, the software subsystem 1 reads a value of the flag bit, and determines, if the value of the flag bit is 0, that the flash memory and the flash memory controller are not initialized. In this case, the software subsystem 1 initializes the flash memory and the flash memory controller when being powered on and started, and sets the flag bit to 1. When being powered on and started, the software subsystem 2 reads the value of the flag bit, and determines that the flash memory and the flash memory controller have been initialized because the value of the flag bit is 1. In this case, the software subsystem 2 may directly read an initialized related parameter from the flash memory controller or a chip register, and does not need to initialize the flash memory and the flash memory controller again. However, in an existing solution, because the flash memory controller is exclusively occupied by the main control system, the main control system needs to initialize the flash memory and the flash memory controller when being started. However, because other software subsystems than the main control system cannot be in direct contact with the flash memory controller, initialization of the flash memory and the flash memory controller cannot be identified and controlled. In this embodiment, a flag bit is set, so that when being powered on, each software subsystem can learn whether the flash memory and the flash memory controller have been initialized, and when the flash memory and the flash memory controller are not initialized, any software subsystem can initialize the flash memory and the flash memory controller, and when the plurality of software subsystems is powered on and started, the flash memory and the flash memory controller may be initialized only once, so that a problem such as an exception of the powered-on software subsystem or a data loss that is caused by a plurality of initializations can be avoided.

It should be noted that a difference between the system architecture shown in FIG. 6 and the system architecture shown in FIG. 4 or FIG. 5 lies in that the access arbitration apparatus in the SoC chip shown in FIG. 6 is independent of the flash memory controller. In the SoC chip shown in FIG. 4, the access arbitration apparatus and the flash memory controller are integrated to form the access controller.

Optionally, a specific implementation form of the access controller in the SoC chip is not limited in this embodiment. FIG. 4 to FIG. 6 are merely used as examples for illustration herein.

In actual application, the access controller may alternatively be an independent chip.

Figure 8:
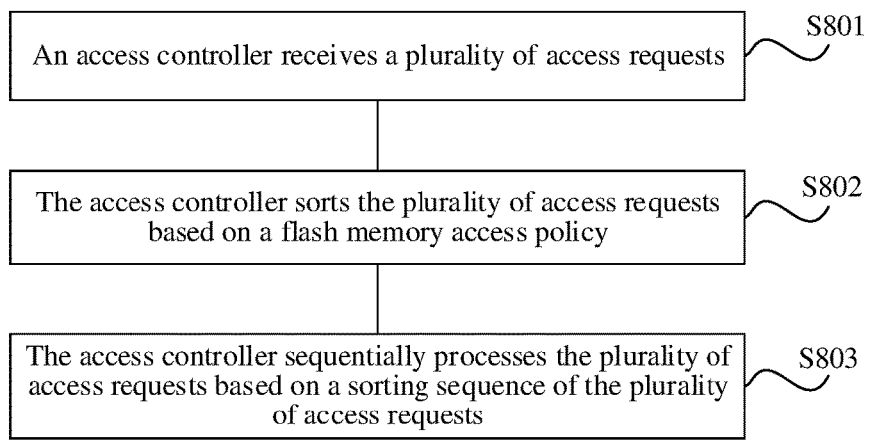
FIG. 8 is a schematic flowchart of a flash memory access method according to an embodiment of the present disclosure.

With reference to FIG. 4 to FIG. 7, as shown in FIG. 8, an embodiment of the present disclosure provides a flash memory access method. The method is applied to the SoC chip in FIG. 4 to FIG. 6. The method includes the following steps.

S801: An access controller receives a plurality of access requests.

The plurality of access requests is used to request to access a same flash memory, the plurality of access requests are access requests of a plurality of software subsystems, and the plurality of software subsystems run on different processor cores of a same chip. Optionally, the chip may be an SoC chip, the SoC chip may be the SoC chip in FIG. 4 to FIG. 6, and the processor core may be a CPU core in the SoC chip. A software subsystem may run on one or more CPU cores, and different software subsystems run on different CPU cores.

For example, the SoC chip includes the access controller, and the access controller may be independently powered on and powered off. For example, the access controller may be powered on and powered off with any software subsystem, so that each software subsystem can independently access a Flash device.

For example, the plurality of access requests includes a first access request and a second access request. The first access request is an access request of a first software subsystem, the second access request is an access request of a second software subsystem, and the first software subsystem and the second software subsystem run on different processor cores. For example, the first software subsystem runs on a first processor core, and the second software subsystem runs on a second processor core. In the following embodiments of the present disclosure, the flash memory access method provided in the present disclosure is described by using only an example in which the plurality of access requests are the first access request and the second access request.

For example, a software subsystem 1 runs on a CPU core 1, and a software subsystem 2 runs on a CPU core 2. The software subsystem 1 sends an access request 1 through the CPU core 1, and the software subsystem 2 sends an access request 2 through the CPU core 2. The access request 1 and the access request 2 are used to request to access a same flash memory.

Optionally, the flash memory may be a Flash device such as a serial peripheral interface (SPI) Nor Flash, an SPI NAND Flash, an NAND flash, an embedded multimedia control (embedded multi-media card, EMMC), or a universal flash storage (UFS). A specific type of the flash memory is not limited in this embodiment. The flash memory may have a readable, writable, or erasable function.

For example, that the access controller receives the plurality of access requests in step S801 may include: The access controller receives a first access request from a first processor core, and receives a second access request from a second processor core.

Optionally, the first software subsystem and the second software subsystem may simultaneously request to access a same flash memory, that is, the first processor core and the second processor core may simultaneously send access requests, and request to access the same flash memory.

S802: The access controller sorts the plurality of access requests based on a flash memory access policy.

For example, the flash memory access policy includes at least one of access policies such as processing the access requests based on priorities of the software subsystems, processing the access requests based on priorities of the access requests, or processing the access requests based on a time sequence of the access requests. Specific content of the flash memory access policy is not limited in this embodiment, and is merely an example for description herein.

For example, an example in which the flash memory access policy is processing the access requests based on the priorities of the software subsystems is used. When the software subsystem 1 sends the access request 1 through the CPU core 1, and the software subsystem 2 sends the access request 2 through the CPU core 1, the access controller may sort the access request 1 and the access request 2 based on priorities of the software subsystem 1 and the software subsystem 2. If the priority of the software subsystem 1 is higher than the priority of the software subsystem 2, a sorting sequence of the access request 1 precedes a sorting sequence of the access request 2.

For another example, an example in which the flash memory access policy is preferentially processing the access requests based on the time sequence of the access requests, and if the time sequences of the access requests are the same, processing the access requests based on the priorities of the software subsystems is used. When the access controller first receives the access request 2, and then receives the access request 1, a sorting sequence of the access request 2 precedes a sorting sequence of the access request 1. When the access controller simultaneously receives the access request 1 and the access request 2, if a priority of the software subsystem 1 is higher than a priority of the software subsystem 2, a sorting sequence of the access request 1 precedes a sorting sequence of the access request 2.

For another example, that the flash memory access policy is processing the access requests based on the priorities of the access requests is used as an example. Each access request carries a priority identifier. The access controller may determine a priority of the access request 1 and a priority of the access request 2 based on a priority identifier carried in the access request 1 and a priority identifier carried in the access request 2. If the priority of the access request 2 is higher than the priority of the access request 1, a sorting sequence of the access request 2 precedes a sorting sequence of the access request 1.

Optionally, when the access controller includes the access arbitration apparatus and the flash memory controller, step S802 is performed by the access arbitration apparatus.

S803: The access controller sequentially processes the plurality of access requests based on a sorting sequence of the plurality of access requests.

The following describes an implementation of step S803 by using an example in which the plurality of access requests includes a first access request and a second access request, and a sorting sequence of the first access request precedes a sorting sequence of the second access request.

In an implementation, that the access controller sequentially processes the plurality of access requests based on the sorting sequence of the plurality of access requests in step S803 may include: The access controller executes the first access request in the flash memory based on the sorting sequences of the first access request and the second access request, and adds the second access request to a cache queue; and the access controller executes the second access request in the flash memory after processing the first access request. Optionally, executing the first access request in the flash memory indicates accessing an address space in the flash memory based on the first access request, and executing the second access request in the flash memory indicates accessing the address space in the flash memory based on the second access request.

For example, after receiving the access request 1 and the access request 2, the access controller sorts the access request 1 and the access request 2 based on the flash memory access policy. If the sorting sequence of the access request 1 precedes the sorting sequence of the access request 2, the access request 1 requests to read data in the Flash, and the access request 2 requests to write data in the Flash. In this case, the flash memory controller may add the access request 2 to the cache queue, and read data from the Flash. After the flash memory controller returns the read data to the CPU core 1, the flash memory controller writes data into the Flash.

In another implementation, if the access controller includes the access arbitration apparatus and the flash memory controller, that the access controller sequentially processes the plurality of access requests based on the sorting sequence of the plurality of access requests in step S803 includes: The access arbitration apparatus sends the first access request to the flash memory controller based on the sorting sequences of the first access request and the second access request, and adds the second access request to the cache queue. The flash memory controller receives the first access request, and executes the first access request in the flash memory. After the flash memory controller processes the first access request, the access arbitration apparatus sends the second access request to the flash memory controller. The flash memory controller receives the second access request, and executes the second access request in the flash memory.

For example, after receiving the access request 1 and the access request 2, the access arbitration apparatus sorts the access request 1 and the access request 2 based on the flash memory access policy. If the sorting sequence of the access request 1 precedes the sorting sequence of the access request 2, the access request 1 requests to read data in the Flash, and the access request 2 requests to write data in the Flash. The access arbitration apparatus may send the access request 1 to the flash memory controller, and add the access request 2 to the cache queue. After receiving the access request 1, the flash memory controller reads data from the Flash. If the access arbitration apparatus finds that the flash memory controller has processed the access request 1, the access arbitration apparatus sends the access request 2 to the flash memory controller. After receiving the access request 2, the flash memory controller writes data into the Flash. Optionally, the access arbitration apparatus may learn, in an interruption manner or a query manner, whether the flash memory controller has processed the first access request.

It may be understood that according to the flash memory access method provided in this embodiment, when a plurality of software subsystems running on one chip simultaneously access a same flash memory, because the access controller may be powered on and powered off with any software subsystem, the plurality of software subsystems can independently access the same flash memory device without configuring a flash memory controller or a flash memory device for each of the plurality of software subsystems, thereby reducing a chip area and reducing chip costs and costs of an embedded device. In addition, the access controller sorts the access requests of the plurality of software subsystems, and sequentially processes the access requests based on the sorting sequence, so that no conflict occurs when the plurality of software subsystems access the same flash memory device.

Optionally, to improve security of the plurality of software subsystems running on the same chip, and avoid a misoperation among the plurality of software subsystems, an address space for each software subsystem to access a flash memory may be limited, to ensure secure and stable running of the plurality of software subsystems.

Figure 9:
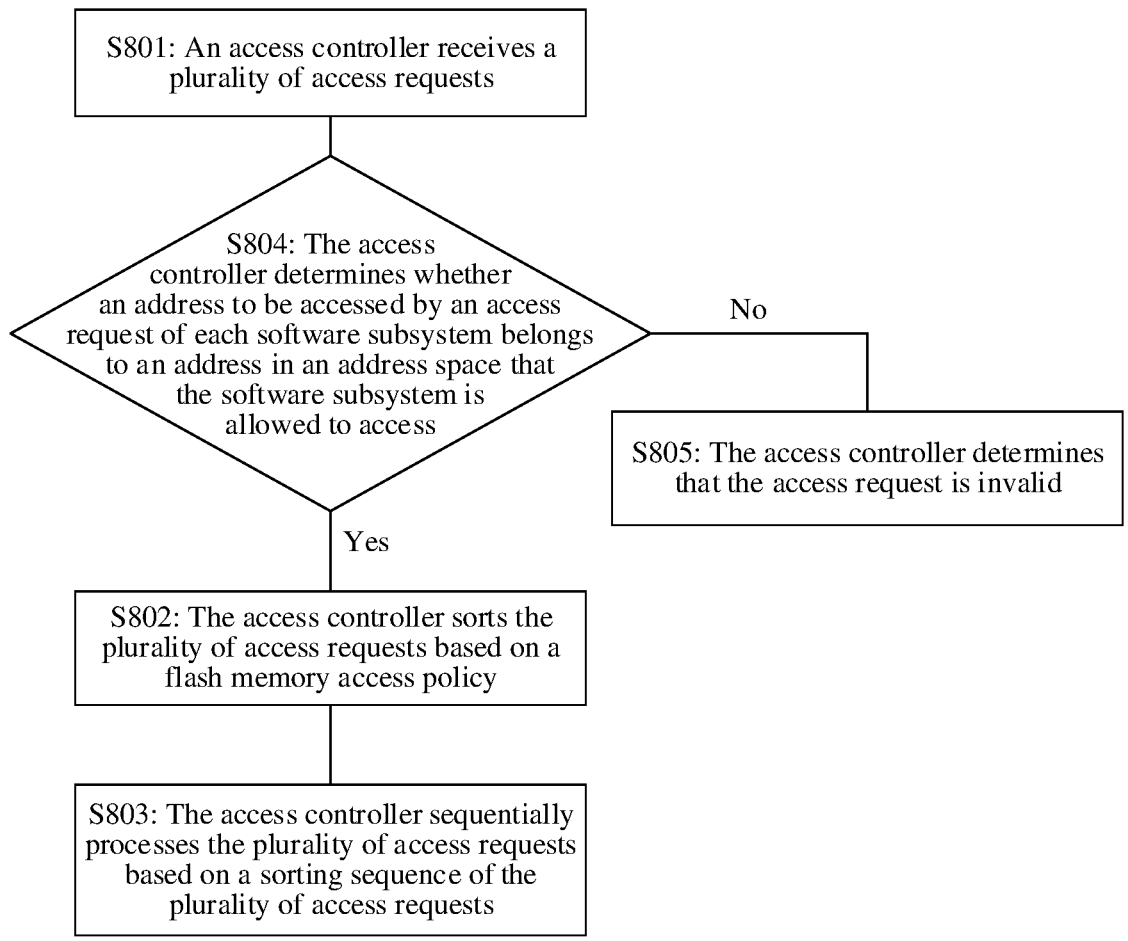
FIG. 9 is a schematic flowchart of another flash memory access method according to an embodiment of the present disclosure.

Optionally, as shown in FIG. 9, an embodiment of the present disclosure further provides a flash memory access method, and the method may further include step S804 and step S805.

S804: The access controller determines whether an address to be accessed by an access request of each software subsystem belongs to an address in an address space that the software subsystem is allowed to access.

For example, the access requests of the software subsystems include the first access request of the first software subsystem and the second access request of the second software subsystem. An address space that the first software subsystem is allowed to access is a first address space, an address space that the second software subsystem is allowed to access is a second address space, and an address in the first address space is not completely the same as an address in the second address space.

That the access controller determines whether the access request of each software subsystem belongs to the address in the address space that the software subsystem is allowed to access includes: The access controller determines whether an address to be accessed by the first access request belongs to the address in the first address space, and the access controller determines whether an address to be accessed by the second access request belongs to the address in the second address space. The address to be accessed by the first access request may be a first destination address, and the first access request includes the first destination address. The address to be accessed by the second access request may be a second destination address, and the first access request includes the second destination address.

Figure 10:
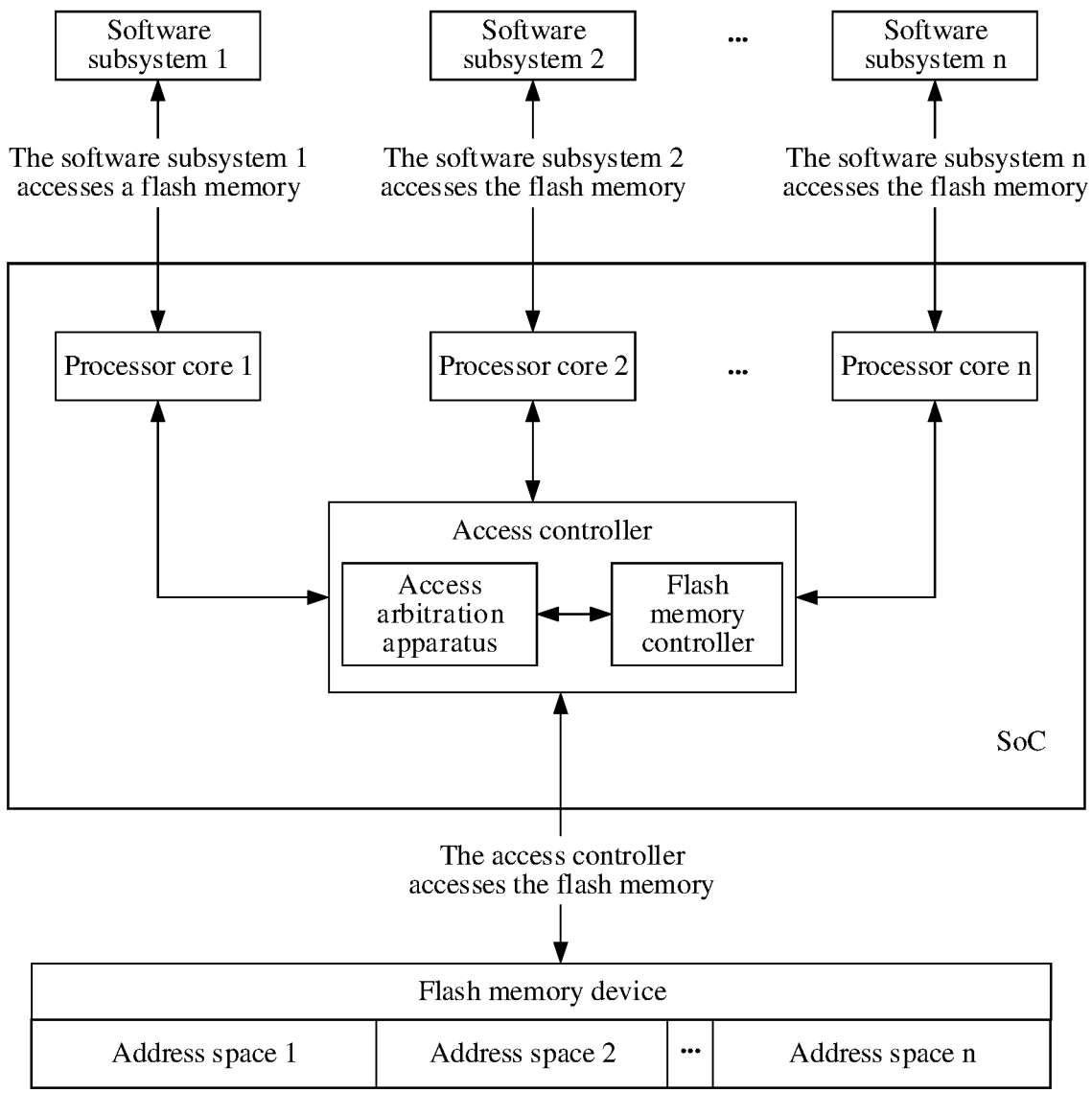
FIG. 10 is a schematic diagram of another system architecture in which a plurality of software subsystems accesses a flash memory according to an embodiment of the present disclosure.

For example, as shown in FIG. 10, a software subsystem 1 is allowed to access an address space 1 in the flash memory device, a software subsystem 2 is allowed to access an address space 2 in the flash memory device, and a software subsystem n is allowed to access an address space n in the flash memory device. After receiving the access request 1 of the software subsystem 1, the access controller determines whether a destination address 1 in the access request 1 belongs to an address in the address space 1. After receiving the access request 2 of the software subsystem 2, the access controller determines whether a destination address 2 in the access request 2 belongs to an address in the address space 2. After receiving the access request n of the software subsystem n, the access controller determines whether a destination address n in the access request n belongs to an address in the address space n.

Optionally, generally, as shown in FIG. 10, addresses in address spaces that different software subsystems are allowed to access in a flash memory Flash are different from each other. For example, an address in the first address space that the first software subsystem is allowed to access is different from an address in the second address space that the second software subsystem is allowed to access. However, for output sharing among the plurality of software subsystems, the plurality of software subsystems may share an address space in the flash memory Flash, and different software subsystems may be allowed to perform different operations in the address space. For example, the address space of the Flash includes a shared address space, and both the first address space that the first software subsystem is allowed to access and the second address space that the second software subsystem is allowed to access may include the shared address space. That is, both the first software subsystem and the second software subsystem can access an address in the shared address space. That is, when different software subsystems have a sharing requirement, the flash memory may include a shared address, and the different software subsystems can access the shared address. When different software subsystems have no sharing requirement, the different software subsystems are allowed to access different addresses.

Optionally, the first address space and the second address space may be preset address spaces, and the preset address space may be stored in a one-time programmable memory. Alternatively, the first address space and the second address space may be address spaces configured by a main control system, and an address space that the main control system is allowed to access in the flash memory may be preset. For example, the second software subsystem is used as a main control system. An address space (the second address space) that the second software subsystem is allowed to access in the flash memory is a preset address space, and the first address space may be configured after the second software subsystem is started.

For example, the first address space and the second address space may be fixed in chip logic. For another example, the first address space and the second address space may be burned into an OTP or an efuse during production. For another example, the first address space may be an address space configured after the second software subsystem is started, and the second address space may be an address space configured after the first software subsystem is started. A specific manner of configuring the first address space and the second address space is not limited in this embodiment. This is merely an example for description herein.

Optionally, the address space that each software subsystem is allowed to access in the flash memory may include a Boot space and another space. The Boot space is used to store a boot program, and the another space is used to store an operating system image, a file system, another program of the system, a resource, and the like. For example, the Boot space is used to store a boot, and the another space is used to store a kernel, a file system, other data, and the like. It may be understood that the Boot is a boot program stored in a Flash device, and is used to load an operating system in a software subsystem.

Optionally, the Boot space of each software subsystem may be fixed in chip logic, and the another space that each software subsystem is allowed to access may be configured by the main control system. Because the Boot space is small (for example, 1 Mb) and the another space is large (for example, 200 Mb), the chip needs to hard-code only the small Boot space, and the another large space is configured by using software, so that a chip design can be simplified. In addition, when the another space is configured by using the software, the software may dynamically configure, based on an actual service requirement, a size of the another space that each software subsystem is allowed to access, so that the size of the another space that each software subsystem is allowed to access is not fixed, thereby improving utilization of the flash memory.

Figure 11:
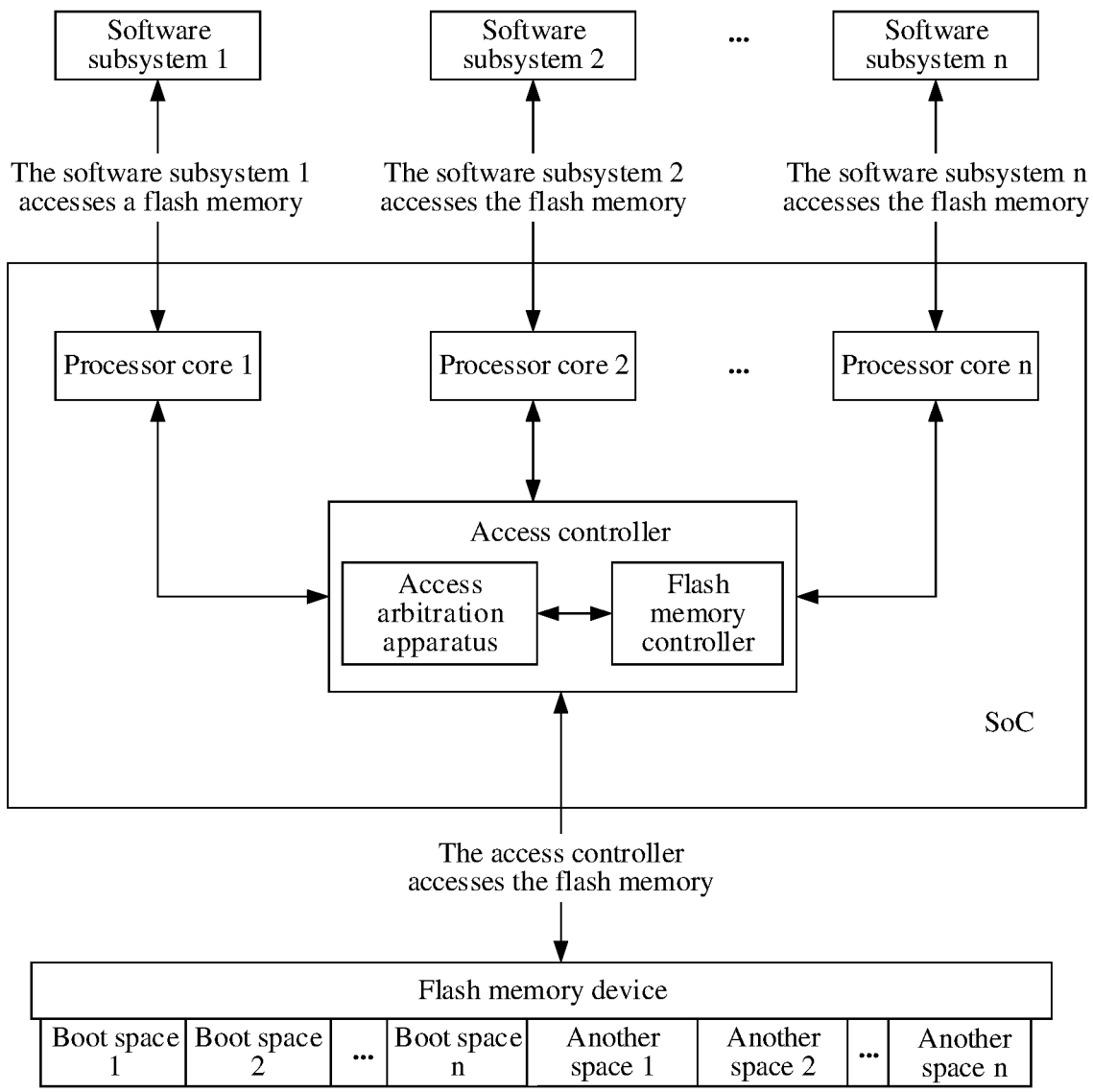
FIG. 11 is a schematic diagram of another system architecture in which a plurality of software subsystems accesses a flash memory according to an embodiment of the present disclosure.

For example, as shown in FIG. 11, a software subsystem 1 is allowed to access a Boot space 1, a software subsystem 2 is allowed to access a Boot space 2, and a software subsystem n is allowed to access a Boot space n. Addresses in the Boot space 1, the Boot space 2, and the Boot space n may be hard-coded in the OTP or the efuse. Another space 1 that the software subsystem 1 is allowed to access, another space 2 that the software subsystem 2 is allowed to access, and another space n to which the software subsystem n is allowed to access may be configured by software (for example, the main control system).

Optionally, the Boot space and the another space of a same software subsystem may be adjacent spaces, or may be non-adjacent spaces in the flash memory. This is not limited in this embodiment. In FIG. 11, only an example in which the Boot space of the same software subsystem is separated from the another space is used for illustration.

Optionally, the address space that each software subsystem is allowed to access may include a default access address when the software subsystem is started. For example, the first address space may include a first default access address, and the second address space may include a second default access address. The first default access address is an address where the first software subsystem accesses the flash memory when being started, and the second default access address is an address where the second software subsystem accesses the flash memory when being started. The first default access address is different from the second default access address. In this way, the plurality of software subsystems can be started and work independently without depending on other software subsystems.

It may be understood that when the access controller includes the access arbitration apparatus and the flash memory controller, step S804 is performed by the access arbitration apparatus.

Optionally, step S804 may be performed before step S803, or may be performed before step S802. A sequence of performing step S804 and step S802 and step S803 is not limited in this embodiment. In FIG. 9, only an example in which step S804 is performed before step S802 is used for description.

When the access controller determines that the address to be accessed by the access request of the software subsystem belongs to the address in the address space that the software subsystem is allowed to access in step S804, the access controller continues to perform step S802 and step S803. For example, when the access controller determines that the first destination address belongs to the address in the first address space and/or the second destination address belongs to the address in the second address space, the access controller continues to perform step S802 and step S803.

For example, as shown in FIG. 10, the software subsystem 1 is allowed to access the address space 1 in the flash memory device, the software subsystem 2 is allowed to access the address space 2 in the flash memory device, and the software subsystem n is allowed to access the address space n in the flash memory device. When the destination address 1 in the access request 1 of the software subsystem 1 belongs to an address in the address space 1, and the destination address 2 in the access request 2 of the software subsystem 2 belongs to an address in the address space 2, and the destination address n in the access request n of the software subsystem n belongs to an address in the address space n, the access controller sorts the access request 1, the access request 2, and the access request n based on an access policy, and sequentially processes the access request 1, the access request 2, and the access request n based on a sorting sequence.

When determining that the address to be accessed by the access request of the software subsystem does not belong to the address in the address space that the software subsystem is allowed to access in step S804, the access controller continues to perform step S805.

S805: When the address to be accessed by the access request of the software subsystem does not belong to the address in the address space that the software subsystem is allowed to access, the access controller determines that the access request is invalid.

For example, when the access controller determines that the first destination address does not belong to the address in the first address space, and the second destination address does not belong to the address in the second address space, the access controller determines that the first access request and the second access request are invalid. The access controller does not process the first access request and the second access request. For example, when the access controller includes the access arbitration apparatus and the flash memory controller, the access arbitration apparatus determines that the first access request and the second access request are invalid, and the access arbitration apparatus does not send the first access request and the second access request to the flash memory controller.

For example, when the access controller determines that the first destination address belongs to the address in the first address space and the second destination address does not belong to the address in the second address space, the access controller determines that the first access request is valid and the second access request is invalid. In this case, the access controller may continue to process the first access request according to step S802 and step S803. When the access controller determines that the first destination address does not belong to the address in the first address space, and the second destination address belongs to the address in the second address space, the access controller determines that the first access request is invalid, and continues to process the second access request.

For example, as shown in FIG. 10, a software subsystem 1 is allowed to access an address space 1 in the flash memory device, a software subsystem 2 is allowed to access an address space 2 in the flash memory device, and a software subsystem n is allowed to access an address space n in the flash memory device. When the destination address 1 in the access request 1 of the software subsystem 1 belongs to the address in the address space 2 (that is, does not belong to the address in the address space 1), the destination address 2 in the access request 2 of the software subsystem 2 belongs to the address in the address space 2, and the destination address n in the access request n of the software subsystem n belongs to the address in the address space n, the access controller determines that the access request 1 is invalid, and the access request 2 and the access request n are valid. In this case, the access controller sorts the access request 2 and the access request n based on the access policy and sequentially processes the access request 2 and the access request n based on the sorting sequence.

It may be understood that, in this embodiment, the access controller may determine whether a destination address of an access request of each software subsystem received by the access controller belongs to an address in an address space that the software subsystem is allowed to access. When the destination address of the access request belongs to the address in the address space that the software subsystem is allowed to access, these access requests are sorted based on the flash memory access policy, and these access requests are sequentially processed based on the sorting sequence. When the destination address of the access request does not belong to the address in the address space that the software subsystem is allowed to access, it is determined that the access request is invalid.

Optionally, when the access controller determines that the first access request or the second access request is invalid, the access controller may further report error information, to indicate that the address requested to be accessed by the software subsystem is beyond access permission.

It should be noted that in this embodiment, an access space of each software subsystem is limited, so that security of the plurality of software subsystems running on the same chip can be improved, and a misoperation among the plurality of software subsystems can be avoided.

Figure 12:
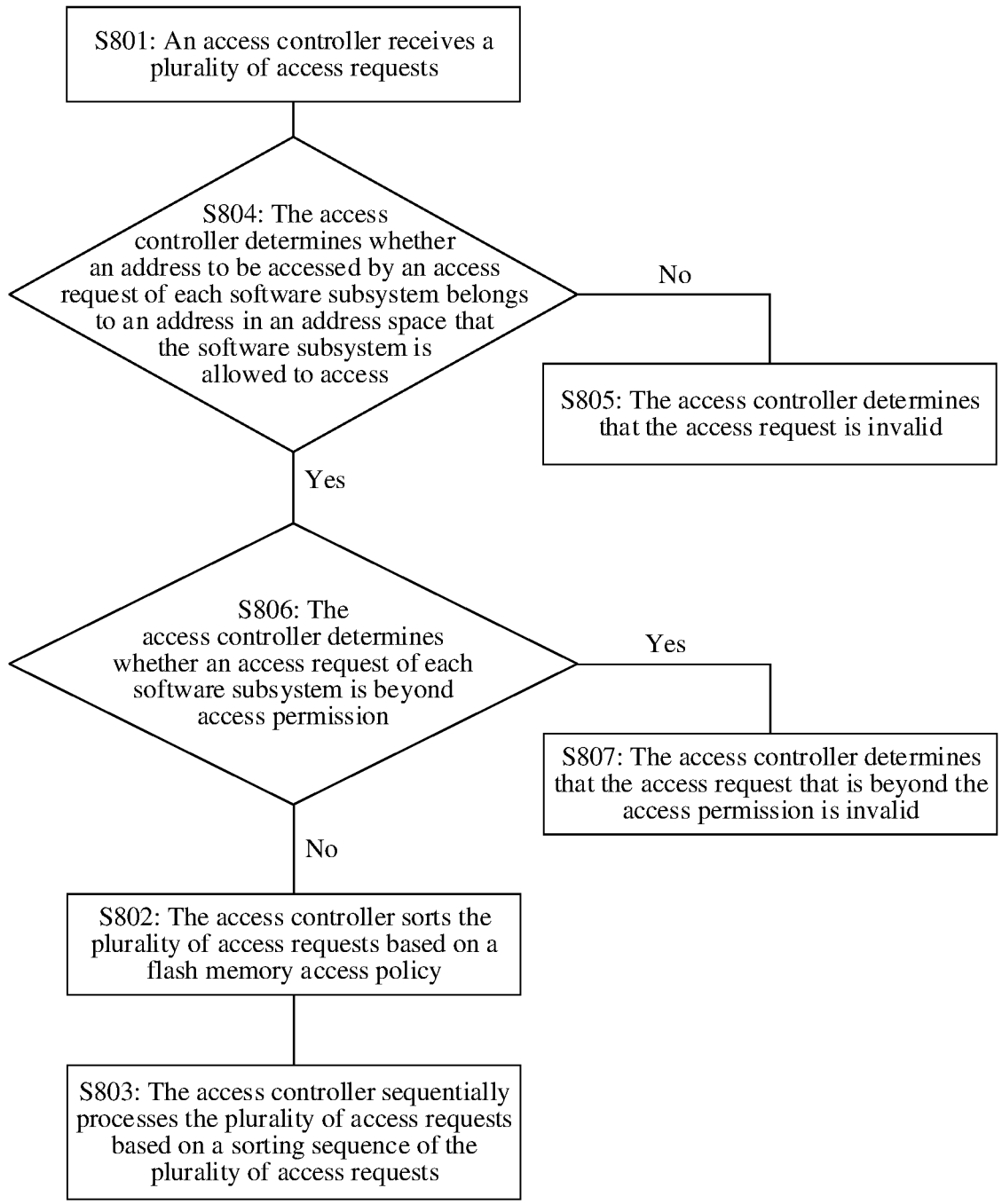
FIG. 12 is a schematic flowchart of another flash memory access method according to an embodiment of the present disclosure.

Optionally, as shown in FIG. 12, an embodiment of the present disclosure further provides a flash memory access method, and the method may further include step S806 and step S807.

S806: The access controller determines whether an access request of each software subsystem is beyond access permission.

For example, the access permission includes read-only, write-only, erasable-only, read/write and non-erasable, readable and erasable but not writable, or writable and erasable but not readable.

Optionally, access permission of different software subsystems may be the same or may be different. This is not limited in this embodiment. For example, that the access controller determines whether the access request of each software subsystem is beyond the access permission may include: The access controller determines whether the access request of each software subsystem is beyond access permission of the software subsystem.

It may be understood that when the access controller includes the access arbitration apparatus and the flash memory controller, step S806 is performed by the access arbitration apparatus.

Optionally, a sequence of performing step S802, step S803, step S804, and step S806 is not limited in this embodiment. FIG. 12 is merely an example.

When determining that the access request of the software subsystem is not beyond the access permission in step S806, the access controller continues to perform step S802 and step S803.

S807: When the access request of the software subsystem is beyond the access permission, the access controller determines that the access request that is beyond the access permission is invalid.

For example, when the access request is beyond the access permission, the access controller may further report error information to indicate that the access request of the software subsystem is beyond the access permission.

It may be understood that according to the flash memory access method provided in this embodiment, because the access controller may be powered on and powered off with any software subsystem, the plurality of software subsystems can independently access the same flash memory device without configuring a flash memory controller or a flash memory device for each of the plurality of software subsystems, thereby reducing a chip area and reducing chip costs and costs of an embedded device. In addition, the access controller can sort the access requests of the plurality of software subsystems, and sequentially process the access requests based on the sorting sequence, so that no conflict occurs when the plurality of software subsystems access the same flash memory device.

An embodiment of the present disclosure further provides a system on chip. The chip includes an access controller and a plurality of processor cores. A plurality of software subsystems run on the plurality of processor cores, and different software subsystems run on different processor cores. The plurality of processor cores is configured to send a plurality of access requests to the access controller, where the plurality of access requests is used to request to access a same flash memory, and the plurality of access requests are access requests of the plurality of software subsystems. The access controller is configured to perform the flash memory access method in any embodiment in FIG. 8, FIG. 9, or FIG. 12. Optionally, the access controller may be independently powered on and powered off.

Figure 13:
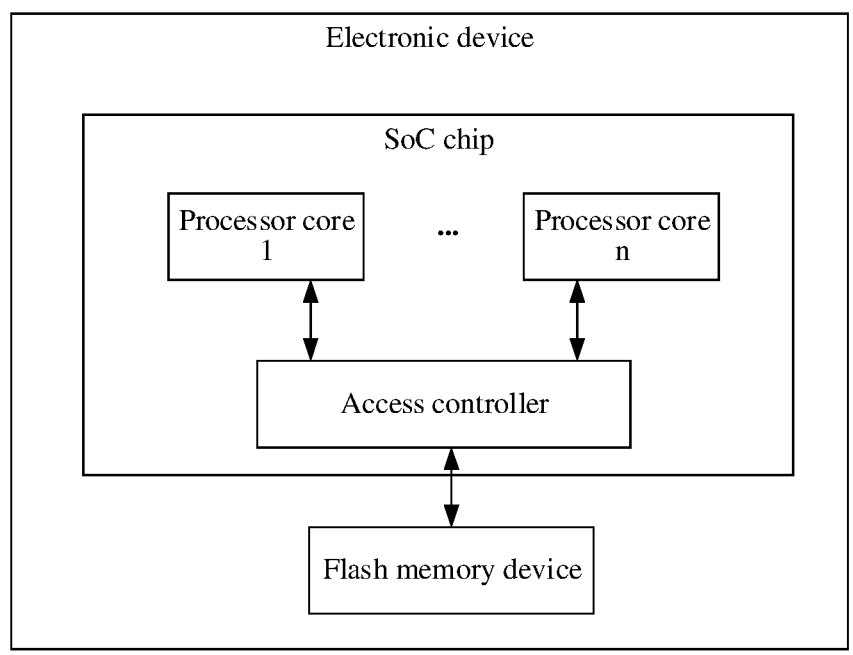
FIG. 13 is a schematic diagram of a structure of an electronic device according to an embodiment of the present disclosure.

An embodiment of the present disclosure further provides an electronic device. As shown in FIG. 13, the electronic device includes a flash memory device and an SoC chip. The SoC chip includes the access controller and the plurality of processor cores. The plurality of processor cores is separately connected to the access controller through a bus, and a plurality of software subsystems run on the plurality of processor cores. Different software subsystems run on different processor cores. A power supply of the access controller is different from power supplies of the plurality of processor cores, or the access controller shares a same power supply with a first processor core that runs a first software subsystem, and a power-on duration of the first processor core is greater than or equal to a preset duration. The plurality of processor cores is configured to send a plurality of access requests to the access controller, where the plurality of access requests is used to request to access a same flash memory, and the plurality of access requests are access requests of the plurality of software subsystems. The access controller is configured to perform the flash memory access method in any embodiment in FIG. 8, FIG. 9, or FIG. 12. Optionally, the access controller may be independently powered on and powered off.

Method or algorithm steps described in combination with the content disclosed in the present disclosure may be implemented by hardware, or may be implemented by a processor by executing software instructions. The software instructions may include a corresponding software module. The software module may be stored in a random access memory (RAM), a flash memory, an erasable programmable read-only memory (erasable programmable ROM, EPROM), an electrically erasable programmable read-only memory (electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an application specific integrated circuit (ASIC). In addition, the ASIC may be located in an embedded device. Certainly, the processor and the storage medium may alternatively exist in the embedded device as discrete components.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer-readable storage medium and a communication medium, where the communication medium includes any medium that enables a computer program to be transmitted from one place to another. The storage medium may be any available medium accessible to a general-purpose or dedicated 5 computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made based on the technical solutions of the present invention shall fall within the protection scope of the present invention.

What is claimed is:

1. A flash memory access method, applied to a system on chip (SoC),
wherein the SoC comprises an access controller and a plurality of processor cores, the plurality of processor cores are separately connected to the access controller through a bus, a plurality of software subsystems run on the plurality of processor cores, and different software subsystems run on different processor cores in the plurality of processor cores; a power supply of the access controller is different from power supplies of the plurality of processor cores, or the access controller shares a same power supply with only a subset of the plurality of processor cores, including a first processor core that runs a first software subsystem, and a power-on duration of the first processor core is greater than or equal to a preset duration; and the method comprises:
receiving, by the access controller, a plurality of access requests for requesting to access a same flash memory, wherein the plurality of access requests are access requests of the plurality of software subsystems;
sorting, by the access controller, the plurality of access requests based on a flash memory access policy; and
sequentially processing, by the access controller, the plurality of access requests based on sorting sequences of the plurality of access requests,
wherein the access controller is powered on and off independent of the plurality of processor cores, or the access controller is simultaneously powered on and off with only the subset of the plurality of processor cores.

2. The method according to claim 1, wherein the plurality of access requests comprise a first access request and a second access request, wherein the first access request is an access request of the first software subsystem, the second access request is an access request of a second software subsystem, and a sorting sequence of the first access request precedes a sorting sequence of the second access request; and the sequentially processing, by the access controller, the plurality of access requests based on sorting sequences of the plurality of access requests comprises:
processing, by the access controller, the first access request in the flash memory, and adding the second access request to a cache queue; and
processing, by the access controller, the second access request in the flash memory after processing the first access request.

3. The method according to claim 2, wherein the first software subsystem is allowed to access a first address space in the flash memory, the second software subsystem is allowed to access a second address space in the flash memory, and an address in the first address space is not the same as an address in the second address space.

4. The method according to claim 3, wherein the first access request comprises a first destination address, the second access request comprises a second destination address, and the method further comprises:
when determining that the first destination address does not belong to the address in the first address space, determining, by the access controller, that the first access request is invalid; and/or
when determining that the second destination address does not belong to the address in the second address space, determining, by the access controller, that the second access request is invalid.

5. The method according to claim 3, wherein an address range corresponding to the first address space and an address range corresponding to the second address space are stored in a one-time programmable memory.

6. The method according to claim 5, wherein an address space that each software subsystem is allowed to access comprises a Boot space and another space, an address range corresponding to the Boot space is stored in the one-time programmable memory, and the another space is an address space configured by the software subsystem.

7. The method according to claim 3, wherein the first address space is a preset address space, and the second address space is an address space configured after the first software subsystem is started; or the second address space is a preset address space, and the first address space is an address space configured after the second software subsystem is started.

8. The method according to claim 1, wherein the plurality of access requests comprise a first access request and a second access request, wherein the first access request is an access request of the first software subsystem, the second access request is an access request of a second software subsystem, a sorting sequence of the first access request precedes a sorting sequence of the second access request, and the access controller comprises an access arbitration apparatus and a flash memory controller; and the sequentially processing, by the access controller, the plurality of access requests based on sorting sequences of the plurality of access requests comprises:
sending, by the access arbitration apparatus, the first access request to the flash memory controller, and adding the second access request to a cache queue;
receiving, by the flash memory controller, the first access request, and processing the first access request in the flash memory;
after the flash memory controller processes the first access request, sending, by the access arbitration apparatus, the second access request to the flash memory controller; and
receiving, by the flash memory controller, the second access request, and processing the second access request in the flash memory.

9. The method according to claim 1, wherein the plurality of software subsystems comprises an Android system and a drive system of a baseband.

10. The method according to claim 1, wherein the plurality of software subsystems comprises a wireless fidelity (Wi-Fi) subsystem and a camera subsystem.

11. The method according to claim 10, wherein the access controller shares a same power supply with a processor core that runs the Wi-Fi subsystem.

12. The method according to claim 1, wherein an address at which the software subsystem accesses the flash memory when being started is a default access address, and default access addresses corresponding to a case in which the plurality of software subsystems are started are different from each other.

13. The method according to claim 1, further comprising:
when an access request of the software subsystem is beyond access permission, determining, by the access controller, that the access request that is beyond the access permission is invalid, wherein the access permission comprises read-only, write-only, erasable-only, read/write and non-erasable, readable and erasable but not writable, or writable and erasable but not readable.

14. The method according to claim 1, further comprising:
initializing, by the processor core based on a value of a first flag bit, the access controller and the flash memory when determining that the access controller and the flash memory are not initialized, and setting the value of the first flag bit to a first value; or
obtaining, by the processor core based on a value of a first flag bit, initialization parameters of the access controller and the flash memory when determining that the access controller and the flash memory have been initialized, wherein
the first flag bit can be set to be the first value or a second value, the first value indicates that the access controller and the flash memory have been initialized, and the second value indicates that the access controller and the flash memory are not initialized.

15. The method according to claim 1, wherein the flash memory access policy comprises processing the access requests based on priorities of the software subsystems, processing the access requests based on priorities of the access requests, and/or processing the access requests based on a time sequence of the access requests.

16. A system on chip, comprising an access controller and a plurality of processor cores, wherein
the plurality of processor cores are separately connected to the access controller through a bus, a plurality of software subsystems runs on the plurality of processor cores, and different software subsystems run on different processor cores in the plurality of processor cores;
a power supply of the access controller is different from power supplies of the plurality of processor cores, or the access controller shares a same power supply with only a subset of the plurality of processor cores, including a first processor core that runs a first software subsystem, and a power-on duration of the first processor core is greater than or equal to a preset duration; and
the access controller is configured to perform operations comprising:
receiving a plurality of access requests for requesting to access a same flash memory, wherein the plurality of access requests are access requests of the plurality of software subsystems;
sorting the plurality of access requests based on a flash memory access policy; and
sequentially processing the plurality of access requests based on sorting sequences of the plurality of access requests,
wherein the access controller is powered on and off independent of the plurality of processor cores, or the access controller is simultaneously powered on and off with only the subset of the plurality of processor cores.

17. The system on chip according to claim 16, wherein the plurality of access requests comprise a first access request and a second access request, wherein the first access request is an access request of the first software subsystem, the second access request is an access request of a second software subsystem, and a sorting sequence of the first access request precedes a sorting sequence of the second access request; and the sequentially processing the plurality of access requests based on sorting sequences of the plurality of access requests comprises:
- processing the first access request in the flash memory, and adding the second access request to a cache queue; and
- processing the second access request in the flash memory after processing the first access request.

18. The system on chip according to claim 16, wherein the plurality of access requests comprise a first access request and a second access request, wherein the first access request is an access request of the first software subsystem, the second access request is an access request of a second software subsystem, a sorting sequence of the first access request precedes a sorting sequence of the second access request, and the access controller comprises an access arbitration apparatus and a flash memory controller; and the sequentially processing the plurality of access requests based on sorting sequences of the plurality of access requests comprises:
- sending the first access request to the flash memory controller, and adding the second access request to a cache queue;
- receiving the first access request, and processing the first access request in the flash memory;
- after the flash memory controller processes the first access request, sending the second access request to the flash memory controller; and
- receiving the second access request, and processing the second access request in the flash memory.

\* \* \* \* \*